(12) United States Patent
Shimizu et al.

(10) Patent No.: US 10,167,542 B2
(45) Date of Patent: Jan. 1, 2019

(54) METHOD FOR PRODUCING HOT-DIP ZN ALLOY-PLATED STEEL SHEET

(71) Applicant: NISSHIN STEEL CO., LTD., Tokyo (JP)

(72) Inventors: Atsuo Shimizu, Osaka (JP); Masanori Matsuno, Osaka (JP); Masaya Yamamoto, Osaka (JP); Hirofumi Taketsu, Osaka (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 14/349,334

(22) PCT Filed: Mar. 4, 2013

(86) PCT No.: PCT/JP2013/001312
§ 371 (c)(1),
(2) Date: Apr. 3, 2014

(87) PCT Pub. No.: WO2014/083713
PCT Pub. Date: Jun. 5, 2014

(65) Prior Publication Data
US 2015/0259776 A1   Sep. 17, 2015

(30) Foreign Application Priority Data

Nov. 27, 2012 (JP) .................. 2012-258582
Feb. 4, 2013 (JP) .................. 2013-019275

(51) Int. Cl.
*B05D 1/00* (2006.01)
*D06B 19/00* (2006.01)
(Continued)

(52) U.S. Cl.
CPC .............. *C23C 2/40* (2013.01); *B32B 15/013* (2013.01); *C22C 18/00* (2013.01); *C22C 18/04* (2013.01);
(Continued)

(58) Field of Classification Search
CPC ............ C23C 22/36; C23C 22/73; B05D 5/00
See application file for complete search history.

(56) References Cited

U.S. PATENT DOCUMENTS 2,312,066 A * 2/1943 Clements ................ C23C 22/24
                                                        148/270
3,632,447 A   1/1972 Albrecht et al.
(Continued)

FOREIGN PATENT DOCUMENTS

GB   1336544 A    11/1973
JP   63-072887 A   4/1988
(Continued)

OTHER PUBLICATIONS

JP 2002-226958A English translation abstract.*
(Continued)

*Primary Examiner* — Charles Capozzi
*Assistant Examiner* — Hai Y Zhang
(74) *Attorney, Agent, or Firm* — Brundidge & Stanger, P.C.

(57) ABSTRACT

A hot-dip Zn alloy plating layer is formed on a surface of a base steel sheet by immersing the base steel sheet in a hot-dip Zn alloy plating bath containing Al and Mg. An aqueous solution containing one of or two or more of polyatomic ions selected from the group consisting of a polyatomic ion including $V^{5+}$, a polyatomic ion including $Si^{4+}$, and a polyatomic ion including $Cr^{6+}$ is then contacted with a surface of the hot-dip Zn alloy plating layer. The aqueous solution contains the polyatomic ion in a concen-
(Continued)

tration of 0.01 g/L or more in terms of one of or two or more of atoms selected from the group consisting of V, Si, and Cr.

9 Claims, 7 Drawing Sheets

(51) Int. Cl.
- *C23C 2/40* (2006.01)
- *C23C 2/06* (2006.01)
- *C22C 18/00* (2006.01)
- *C22C 18/04* (2006.01)
- *C23C 22/68* (2006.01)
- *C23C 2/28* (2006.01)
- *B32B 15/01* (2006.01)
- *C23C 2/26* (2006.01)
- *C23C 22/24* (2006.01)
- *C23C 22/36* (2006.01)
- *C23C 22/42* (2006.01)
- *C23C 22/78* (2006.01)

(52) U.S. Cl.
CPC ............... *C23C 2/06* (2013.01); *C23C 2/26* (2013.01); *C23C 2/28* (2013.01); *C23C 22/24* (2013.01); *C23C 22/36* (2013.01); *C23C 22/42* (2013.01); *C23C 22/68* (2013.01); *C23C 22/78* (2013.01)

(56) References Cited

U.S. PATENT DOCUMENTS

| | | | | |
|---|---|---|---|---|
| 4,282,073 A | * | 8/1981 | Hirt | C25D 5/12 205/141 |
| 4,407,899 A | * | 10/1983 | Hara | B05D 7/14 205/155 |
| 2003/0209293 A1 | * | 11/2003 | Sako | C23C 22/34 148/273 |
| 2004/0065389 A1 | * | 4/2004 | Kolberg | C23C 22/182 148/256 |
| 2004/0167266 A1 | * | 8/2004 | Hasegawa | C08G 18/0814 524/406 |
| 2010/0035055 A1 | * | 2/2010 | Okai | C09D 5/082 428/341 |

FOREIGN PATENT DOCUMENTS

| | | | | |
|---|---|---|---|---|
| JP | 63-297576 A | | 12/1988 | |
| JP | 06-158257 A | | 6/1994 | |
| JP | 06-336664 A | | 12/1994 | |
| JP | 11-279733 A | | 10/1999 | |
| JP | 2001-329354 A | | 11/2001 | |
| JP | 2002-226958 A | | 8/2002 | |
| JP | 2003013252 A | * | 1/2003 | ......... C08G 18/0814 |
| JP | 2005-139518 A | | 6/2005 | |
| JP | 2008-169470 A | | 7/2008 | |
| JP | 2009102688 A | * | 5/2009 | |
| JP | 2009-197297 A | | 9/2009 | |

OTHER PUBLICATIONS

JP 2002-226958A English translation detailed description.*
JP 2009-102688A English translation detailed description.*
JP2003013252A English translation.*
Office Action issued in U.S. Appl. No. 14/748,279, dated Sep. 27, 2017.

* cited by examiner

METHOD FOR PRODUCING HOT-DIP ZN ALLOY-PLATED STEEL SHEET

TECHNICAL FIELD

The present invention relates to a method for producing a hot-dip Zn alloy-plated steel sheet having excellent blackening resistance.

BACKGROUND ART

Known plated steel sheets that exhibit excellent corrosion resistance include hot-dip Zn alloy-plated steel sheets each having a hot-dip Zn alloy plating layer containing Al and Mg formed on a surface of a base steel sheet. The plating layer of the hot-dip Zn alloy-plated steel sheet has a composition of, for example, 4.0 to 15.0% by mass of Al, 1.0 to 4.0% by mass of Mg, 0.002 to 0.1% by mass of Ti, 0.001 to 0.045% by mass of B with the balance of Zn and unavoidable impurities. Such a hot-dip Zn alloy-plated steel sheet has a plating layer made of a metal structure in which both a [primary crystal Al phase] and a [Zn single phase] are present in a matrix of an [Al/Zn/Zn$_2$Mg ternary eutectic structure], and shows corrosion resistance and surface appearance sufficiently good as an industrial product.

The hot-dip Zn alloy-plated steel sheet can be continuously produced by the following method. First, a base steel sheet (steel strip) having passed through a furnace is immersed in a hot-dip Zn alloy plating bath containing Al and Mg, and thereafter, the amount of molten metal coating the surface of the base steel sheet is adjusted to a predetermined amount by, for example, passing the base steel sheet through a gas wiping apparatus. Subsequently, the steel strip coated with the predetermined amount of molten metal is passed through an air jet cooler and a mist cooling region, so that the molten metal can be cooled to form a hot-dip Zn alloy plating layer. Furthermore, the steel strip having the hot-dip Zn alloy plating layer formed thereon is passed through a water quenching zone to contact with cooling water, whereby a hot-dip Zn alloy-plated steel sheet is obtained.

In the hot-dip Zn alloy-plated steel sheet thus produced, however, the surface of the plating layer is partly blackened over time in some cases. The blackening of the plating layer surface occurs 2 to 3 days after the production at the earliest, and may occur in 4 to 7 days after production depending upon the production conditions. Thus, the appearance of the hot-dip Zn alloy-plated steel sheet is spoiled.

As a method for preventing the blackening, a method has been proposed in which the surface temperature of a plating layer in a water quenching zone is adjusted (see, for example, PTL 1). According to the invention disclosed in PTL 1, the blackening of the plating layer surface is prevented by setting the surface temperature of the plating layer to be less than 105° C. when contacting the plating layer with cooling water in a water quenching zone. Instead of setting the surface temperature of the plating layer to be less than 105° C., the blackening of the plating layer surface can be prevented also by adding a readily oxidizable element (rare earth element, Y, Zr, or Si) to a plating bath and setting the surface temperature of the plating layer to 105 to 300° C.

CITATION LIST

Patent Literature

PTL 1
Japanese Patent Application Laid-Open No. 2002-226958

SUMMARY OF INVENTION

Technical Problem

In the invention disclosed by PTL 1, since it is necessary to cool the surface of the plating layer to a predetermined temperature before passing it through a water quenching zone, the production of hot-dip Zn alloy-plated steel sheets is restricted in some cases. For example, when producing a thick plated steel sheet, it is necessary to cool it to a predetermined temperature with a lowered feed rate of the plated steel sheet, which unavoidably lowers the productivity. Furthermore, when a readily oxidizable element is added to a plating bath, the readily oxidizable element easily forms a dross, and it is troublesome to control the concentration of the readily oxidizable element, which disadvantageously complicates the production process.

An object of the present invention is to provide a method for producing a hot-dip Zn alloy-plated steel sheet, which can easily suppress blackening of a surface of a plating layer without lowering the productivity and without performing complicated component control of a plating bath.

Solution to Problem

The present inventors have found that the aforementioned problem can be solved by adding a predetermined concentration of a predetermined polyatomic ion to cooling water to be contacted with a hot-dip Zn alloy plating layer after the plating layer is formed, and have made further examinations to accomplish the present invention.

Specifically, the present invention relates to the following methods for producing a hot-dip Zn alloy-plated steel sheet.

[1] A method for producing a hot-dip Zn alloy-plated steel sheet including the steps of: forming a hot-dip Zn alloy plating layer on a surface of a base steel sheet by immersing the base steel sheet in a hot-dip Zn alloy plating bath containing Al and Mg; and contacting an aqueous solution with a surface of the hot-dip Zn alloy plating layer, the aqueous solution containing one of or two or more of polyatomic ions selected from the group consisting of a polyatomic ion including $V^{5+}$, a polyatomic ion including $Si^{4+}$, and a polyatomic ion including $Cr^{6+}$, in which the aqueous solution contains the polyatomic ion in a concentration of 0.01 g/L or more in terms of one of or two or more of atoms selected from the group consisting of V, Si, and Cr.

[2] The method for producing a hot-dip Zn alloy-plated steel sheet according to [1], in which a temperature of the surface of the hot-dip Zn alloy plating layer obtained when the aqueous solution is contacted with the surface of the hot-dip Zn alloy plating layer is 100° C. or above and equal to or less than a solidifying point of the plating layer.

[3] The method for producing a hot-dip Zn alloy-plated steel sheet according to [1] or [2], in which the hot-dip Zn alloy plating layer contains 1.0 to 22.0% by mass of Al, 0.1 to 10.0% by mass of Mg with the balance of Zn and unavoidable impurities.

[4] The method for producing a hot-dip Zn alloy-plated steel sheet according to [3], in which the hot-dip Zn alloy plating layer further contains 0.001 to 2.0% by mass of Si.

[5] The method for producing a hot-dip Zn alloy-plated steel sheet according to [3] or [4], in which the hot-dip Zn alloy plating layer further contains 0.001 to 0.1% by mass of Ti.

[6] The method for producing a hot-dip Zn alloy-plated steel sheet according to any one of [3] to [5], in which the hot-dip Zn alloy plating layer further contains 0.001 to 0.045% by mass of B.

Advantageous Effects of Invention

According to the present invention, a hot-dip Zn alloy-plated steel sheet having excellent blackening resistance can be easily produced with high productivity.

DESCRIPTION OF EMBODIMENTS

Figure 1A:
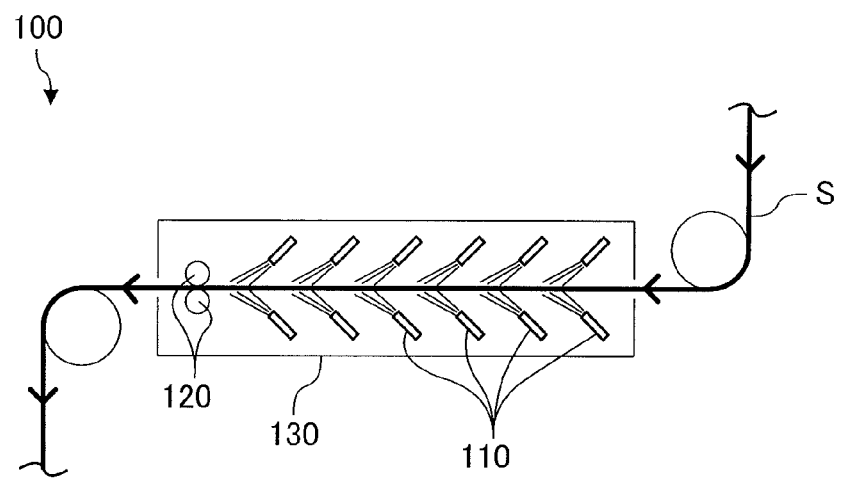
FIGS. 1A and 1B illustrate examples of a method for contacting a cooling aqueous solution with a surface of a hot-dip Zn alloy plating layer.

A method for producing a hot-dip Zn alloy-plated steel sheet (hereinafter may simply referred to as a "plated steel sheet") of the present invention includes: (1) a first step of forming a hot-dip Zn alloy plating layer (hereinafter may simply referred to as a "plating layer") on a surface of a base steel sheet; and (2) a second step of contacting a cooling aqueous solution containing a polyatomic ion with a surface of the hot-dip Zn alloy plating layer. One characteristics of the production method of the present invention is that blackening of a hot-dip Zn alloy plating layer is suppressed by contacting, after formation of the plating layer, a predetermined cooling aqueous solution with the surface of the plating layer.

(1) First Step

In the first step, a base steel sheet is immersed in a hot-dip Zn alloy plating bath containing Al and Mg, so as to form a hot-dip Zn alloy plating layer on a surface of the base steel sheet.

[Base Steel Sheet]

The type of base steel sheet is not especially limited. As the base steel sheet, for example, a steel sheet made of low-carbon steel, medium-carbon steel, high-carbon steel, alloy steel, or the like can be used. When good press formability is required, a steel sheet for deep drawing made of low-carbon Ti-added steel, low-carbon Nb-added steel, or the like is suitably used as the base steel sheet. Alternatively, a high-strength steel sheet containing P, Si, Mn, or the like may be used.

[Formation of Plating Layer]

First, the base steel sheet is immersed in a hot-dip Zn alloy plating bath containing Al and Mg and gas wiping or the like is employed so that a predetermined amount of molten metal coats the surface of the base steel sheet.

The plating bath may have a composition of, for example, 1.0 to 22.0% by mass of Al and 0.1 to 10.0% by mass of Mg with the balance of Zn and unavoidable impurities. The plating bath may further contain 0.001 to 2.0% by mass of Si. The plating bath may still further contain 0.001 to 0.1% by mass of Ti and 0.001 to 0.045% by mass of B. As described in PTL 1, blackening of a plating layer can be suppressed by adding Si, but when the production method of the present invention is employed for producing a plated steel sheet, the blackening of a plating layer can be suppressed even without adding Si.

Subsequently, the molten metal that coats the surface of the base steel sheet is cooled and solidified, and thus, a plated steel sheet having, on the surface of the base steel sheet, a plating layer of substantially the same composition as the plating bath can be produced.

The hot-dip Zn alloy plating layer having the aforementioned composition includes an [Al/Zn/$Zn_2$Mg ternary eutectic structure]. When a cross section of the hot-dip Zn alloy plating layer is observed, it is found that respective phases of Al, Zn, and $Zn_2$Mg are finely lamellarly distributed in the [Al/Zn/$Zn_2$Mg ternary eutectic structure]. Even when the [Al/Zn/$Zn_2$Mg ternary eutectic structure] appears on the surface of the plating layer, the respective phases of Al, Zn, and $Zn_2$Mg are finely distributed.

Although not especially illustrated, an area ratio occupied by the [Al/Zn/$Zn_2$Mg ternary eutectic structure] in the observed cross section depends upon the plating composition. In a Zn—Al—Mg ternary system, a composition containing around 4% by mass of Al and 3% by mass of Mg with the balance of Zn would be an eutectic composition. Therefore, when the plating composition is close to the ternary eutectic composition, the [Al/Zn/$Zn_2$Mg ternary eutectic structure] accounts for about 80% of the area of the cross section, and thus the [Al/Zn/$Zn_2$Mg ternary eutectic structure] is a phase has the largest area ratio in the cross section of the plating layer. As the composition of the plating layer is more deviated from the ternary eutectic composition, however, the area ratio of the [Al/Zn/$Zn_2$Mg ternary eutectic structure] is reduced, and a phase other than the [Al/Zn/$Zn_2$Mg ternary eutectic structure] may have the largest area ratio.

The hot-dip Zn alloy plating layer having the aforementioned composition may include, in addition to the [Al/Zn/$Zn_2$Mg ternary eutectic structure], an Al phase, a Zn phase, or a $Zn_2$Mg phase as primary crystal depending upon the plating composition, or may include a $Mg_2$Si phase if the plating composition contains Si.

An oxide film containing Al, Zn, and Mg is also formed on the surface of the plating layer. When the plating bath contains a predetermined amount of Si, Si may be contained in the oxide film.

A coating amount of the hot-dip Zn alloy plating layer is not especially limited. The coating amount of the hot-dip Zn alloy plating layer is, for example, about 60 to 500 g/m$^2$.

(2) Second Step

In the second step, an aqueous solution containing a predetermined polyatomic ion (i.e., cooling aqueous solution) is contacted with the surface of the hot-dip Zn alloy plating layer. From the viewpoint of productivity, the second step is preferably performed as a water quenching (water cooling) step. In this case, a surface temperature of the hot-dip Zn alloy plating layer when the cooling aqueous solution is contacted with the surface of the hot-dip Zn alloy plating layer is 100° C. or above, and approximately equal to or less than a solidifying point of the plating layer.

The polyatomic ion contained in the cooling aqueous solution is selected from the group consisting of a polyatomic ion including $V^{5+}$, a polyatomic ion including $Si^{4+}$, and a polyatomic ion including $Cr^{6+}$. These polyatomic ions can suppress the blackening of the surface of the plating layer. These polyatomic ions may be singly or in combination.

A method for preparing the cooling aqueous solution containing the polyatomic ion is not especially limited. When a cooling aqueous solution containing, for example, a polyatomic ion including $V^{5+}$ is prepared, a predetermined compound (a V compound, a Si compound, or a Cr compound; hereinafter also referred to as an "additive"), and a dissolution promoter if necessary, are dissolved in water (a solvent). Preferable examples of the V compound include acetylacetone vanadyl, vanadium acetylacetonate, vanadium oxysulfate, vanadium pentoxide, and ammonium vanadate. Preferable examples of the Si compound include sodium silicate. Preferable examples of the Cr compound include ammonium chromate and potassium chromate.

The concentration of the polyatomic ion including $V^{5+}$, the polyatomic ion including $Si^{4+}$, or the polyatomic ion including $Cr^{6+}$ is preferably 0.01 g/L or more in terms of V, Si, or Cr. When two or more of the compounds are used in combination, the total concentration in terms of V, Si, and Cr can be 0.01 g/L or more. When the concentration of such a polyatomic ion is less than 0.01 g/L in terms of V, Si, or Cr, blackening of the surface of the plating layer may not be sufficiently suppressed.

When a dissolution promoter is blended, the amount of the dissolution promoter to be blended is not especially limited. The dissolution promoter can be blended, for example, in 90 to 130 parts by mass based on 100 parts by mass of the additive. When the amount of the dissolution promoter is too small, the additive may not be sufficiently dissolved. On the other hand, when the amount of the dissolution promoter is too large, its promoting effect is saturated, which is disadvantageous in cost.

Examples of the dissolution promoter include 2-aminoethanol, tetraethyl ammonium hydroxide, ethylene diamine, 2,2'-iminodiethanol, and 1-amino-2-propanol.

A method for contacting a cooling aqueous solution with the surface of a hot-dip Zn alloy plating layer is not especially limited. Examples of the method for contacting the cooling aqueous solution with the surface of a hot-dip Zn alloy plating layer include spraying and immersion.

Figure 1B:
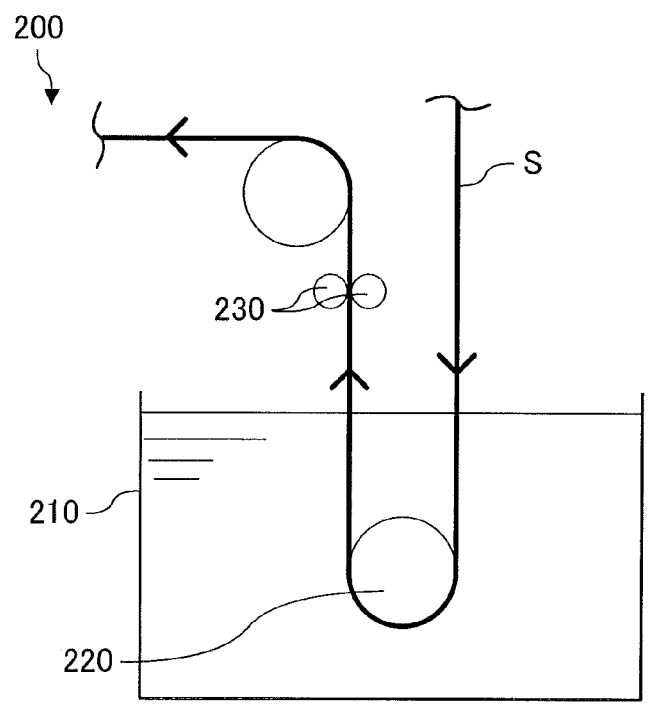

FIGS. 1A and 1B illustrate examples of the method for contacting a cooling aqueous solution with the surface of a hot-dip Zn alloy plating layer. FIG. 1A illustrates an example of the method for contacting a cooling aqueous solution with the surface of a hot-dip Zn alloy plating layer by spraying. FIG. 1B illustrates an example of the method for contacting a cooling aqueous solution with the surface of a hot-dip Zn alloy plating layer by the immersion method.

As illustrated in FIG. 1A, cooling apparatus 100 used for water spray cooling includes a plurality of spray nozzles 110, squeeze rollers 120 disposed downstream of spray nozzles 110 with respect to the feed direction of steel strip S, and housing 130 covering these components. Spray nozzles 110 are disposed to face both sides of steel strip S. In housing 130, steel strip S is cooled with cooling water supplied from spray nozzles 110 in an amount sufficient to temporarily form a water film on the surface of the plating layer. Thereafter, the cooling water is removed by squeeze rollers 120.

Alternatively, as illustrated in FIG. 1B, cooling apparatus 200 used in the immersion method includes immersion tank 210 storing therein cooling water, immersion roll 220 disposed in immersion tank 210, and squeeze rollers 230 disposed on the downstream side from immersion roll 220 along the feed direction of steel strip S, for removing excessive cooling water coating steel strip S. Steel strip S is immersed in immersion tank 210, and then drawn upward with its feed direction changed by rotating immersion roll 220 while being in contact with the cooling water, and then the cooling water is removed by squeeze rollers 230.

The reason why blackening occurring over time in part of a surface of a plating layer of a hot-dip Zn alloy-plated steel sheet can be suppressed by the production method of the present invention is not certain. Now, a presumed mechanism of blackening in a hot-dip Zn alloy plating layer will be described, and thereafter, a presumed mechanism of suppression of the blackening by the production method of the present invention will be described. The mechanism of the suppression of the blackening is, however, not limited to the following assumption.

(Blackening Mechanism)

First, how the present inventors arrived at the presumed mechanism of blackening and the presumed blackening suppression mechanism on the surface of a plating layer will be described. The present inventors produced a hot-dip Zn alloy-plated steel sheet as follows: A hot-dip Zn alloy plating layer having a plating composition of 6% by mass of Al, 3% by mass of Mg, 0.024% by mass of Si, 0.05% by mass of Ti, 0.003% by mass of B with the balance of Zn was formed on a surface of a base steel sheet, and the resulting steel sheet was cooled by passing it through a spray water quenching zone with a water film of cooling water (factory water; pH 7.6, 20° C.) temporarily formed thereon. By "temporarily form a water film" is meant a status where a water film in contact with the surface of the hot-dip Zn alloy-plated steel sheet can be visually observed for 1 second or more. Here, the surface temperature of the hot-dip Zn alloy-plated steel sheet obtained immediately before forming a water film of the cooling water was estimated as about 160° C.

The thus produced hot-dip Zn alloy-plated steel sheet was stored for 1 week within a room (at a temperature of 20° C. and a relative humidity of 60%). After 1 week storage, the surface of the hot-dip Zn alloy-plated steel sheet was visually observed, and found that there were dark portions (blackened portions) less bright than surrounding portions on the surface of the hot-dip Zn alloy-plated steel sheet.

Furthermore, chemical bonding states of Zn, Al, and Mg were analyzed by XPS (X-ray Photoelectron Spectroscopy) analysis in randomly selected thirty positions on a hot-dip Zn alloy-plated steel sheet immediately after production. Thereafter, the analyzed hot-dip Zn alloy-plated steel sheet was stored for 1 week within a room (at a temperature of 20° C. and a relative humidity of 60%). After 1 week storage, the surface of the hot-dip Zn alloy-plated steel sheet was visually observed, resulting in the finding that dark portions (blackened portions) had been formed in some parts of the hot-dip Zn alloy-plated steel sheet. Therefore, a part having a dark portion (blackened portion) formed therein and a part having no dark portion formed therein (a normal portion) were compared in the results of the XPS analysis performed immediately after the production of the hot-dip Zn alloy-plated steel sheet.

Figure 2A:
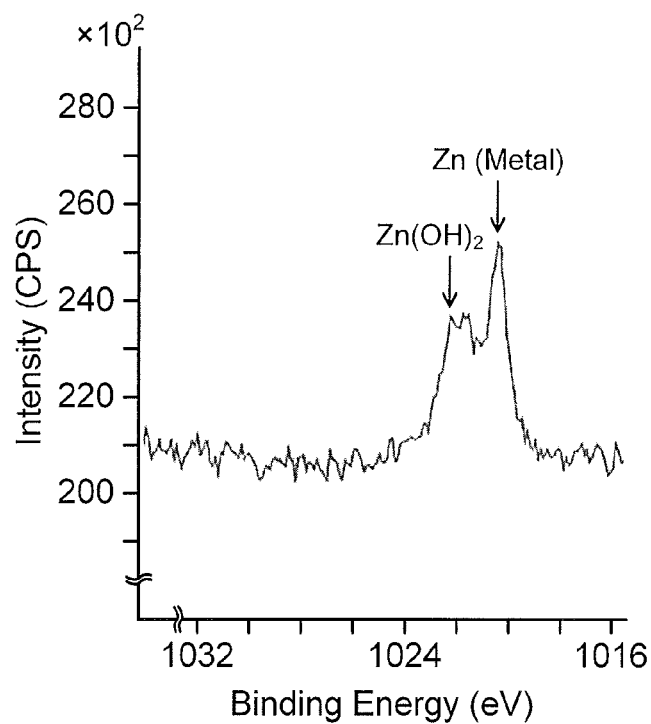
FIGS. 2A and 2B are diagrams of intensity profiles of chemical binding energy corresponding to the 2p orbitals of Zn obtained when a hot-dip Zn alloy plating layer is cooled by using water as cooling water with a water film temporarily formed.
Figure 2B:
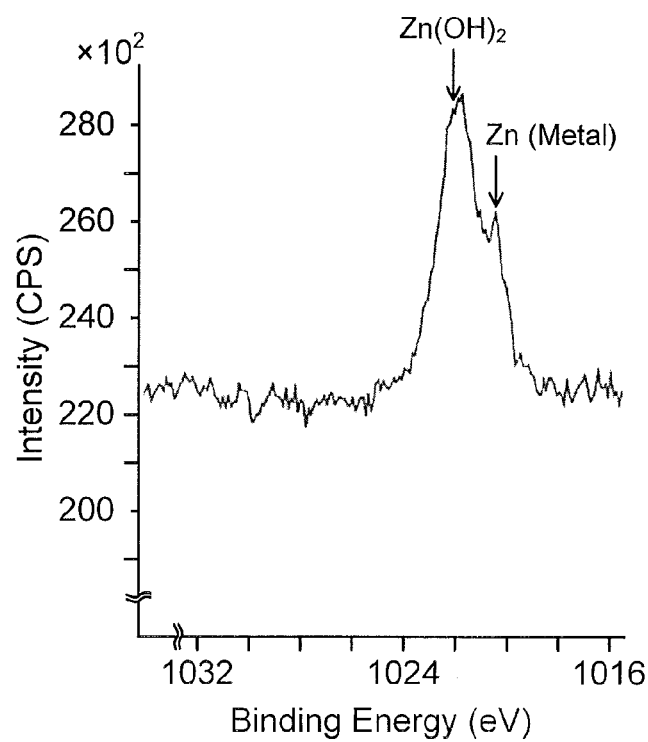
Figure 3A:
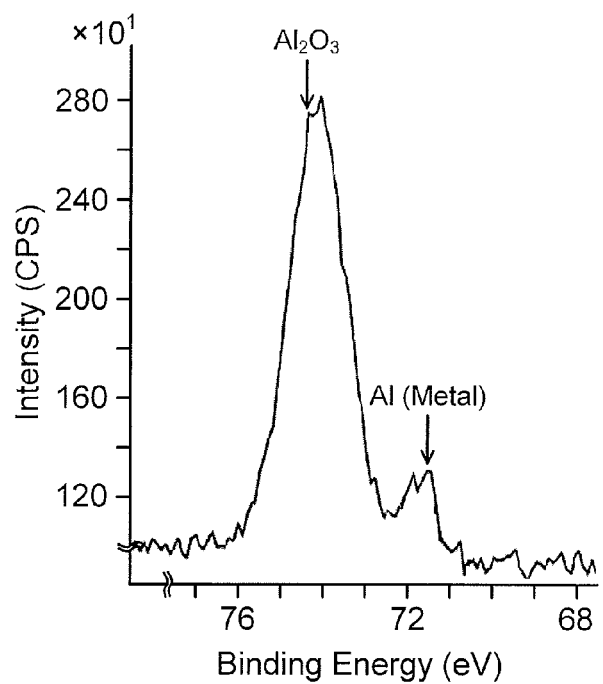
FIGS. 3A and 3B are diagrams of intensity profiles of chemical binding energy corresponding to the 2p orbitals of Al when a hot-dip Zn alloy plating layer is cooled by using water as cooling water with a water film temporarily formed.
Figure 3B:
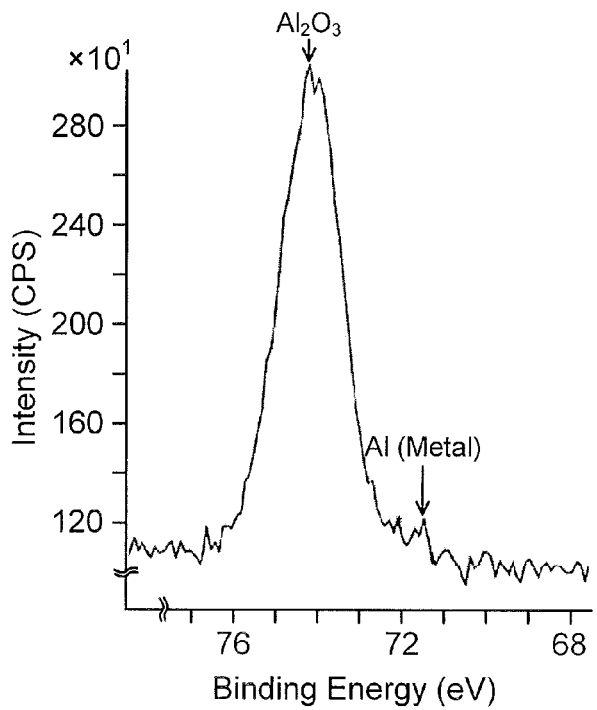
Figure 4A:
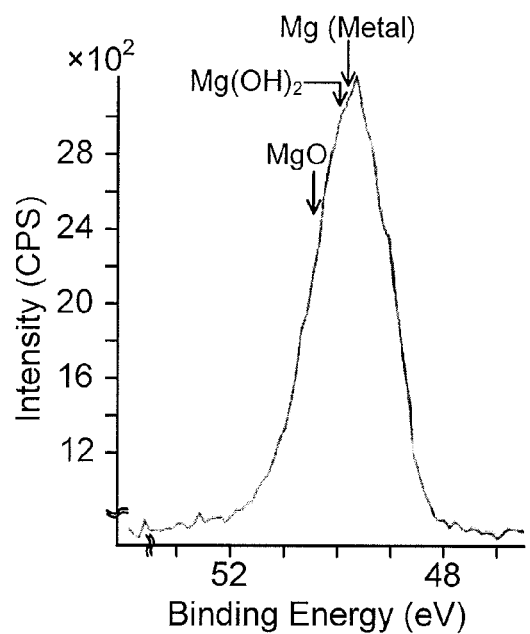
FIGS. 4A and 4B are diagrams of intensity profiles of chemical binding energy corresponding to the 2p orbitals of Mg when a hot-dip Zn alloy plating layer is cooled by using water as cooling water with a water film temporarily formed.
Figure 4B:
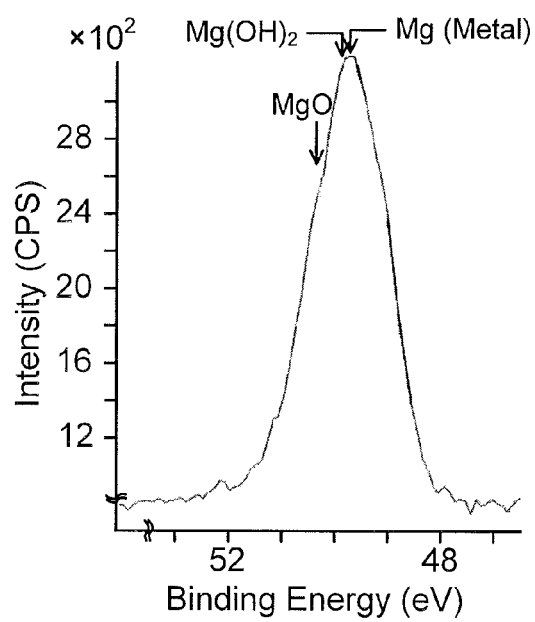

FIGS. 2A, 2B, 3A, 3B, 4A, and 4B are graphs illustrating the results of the XPS analysis performed in normal and blackened portions immediately after producing the hot-dip Zn alloy-plated steel sheet. FIG. 2A illustrates an intensity profile, in a normal portion, of chemical binding energy corresponding to the 2p orbitals of Zn. FIG. 2B illustrates an intensity profile, in a blackened portion, of the chemical binding energy corresponding to the 2p orbitals of Zn. FIG. 3A illustrates an intensity profile, in a normal portion, of chemical binding energy corresponding to the 2p orbitals of Al. FIG. 3B illustrates an intensity profile, in a blackened portion, of the chemical binding energy corresponding to the 2p orbitals of Al. FIG. 4A illustrates an intensity profile, in a normal portion, of chemical binding energy corresponding to the 2p orbitals of Mg. FIG. 4B illustrates an intensity profile, in a blackened portion, of the chemical binding energy corresponding to the 2p orbitals of Mg.

As illustrated in FIG. 2A, in the analysis of Zn in the normal portion, a peak assigned to metal Zn at a binding energy of about 1,020 eV and a peak assigned to $Zn(OH)_2$ at a binding energy of about 1,022 eV having lower intensity than the peak assigned to metal Zn were observed. It is understood from the analysis results that Zn is present in the normal portion not only in pure form (metal Zn) but also as hydroxide ($Zn(OH)_2$). It is understood, on the basis of an intensity ratio between Zn and $Zn(OH)_2$, that Zn is present in a larger amount than $Zn(OH)_2$ in the normal portion.

As illustrated in FIG. 2B, also in the analysis of Zn in the blackened portion, a peak assigned to metal Zn at a binding energy of about 1,020 eV and a peak assigned to $Zn(OH)_2$ at a binding energy of about 1,022 eV having higher intensity than the peak assigned to metal Zn were observed. It is understood from the analysis results that Zn is present in the blackened portion not only in pure form (metal Zn) but also as hydroxide ($Zn(OH)_2$), as with the normal portion. It is understood, on the basis of the intensity ratio between Zn and $Zn(OH)_2$, that $Zn(OH)_2$ is present in a larger amount than Zn in the blackened portion.

As illustrated in FIGS. 3A and 3B, in the analysis of Al in the normal portion and the blackened portion, a peak assigned to metal Al at a binding energy of about 72 eV and a peak assigned to $Al_2O_3$ at a binding energy of about 74 eV having lower intensity than the peak assigned to metal Al were observed in either portion. It is understood from the analysis results that Al is present both in the normal and blackened portions not only in pure form (metal Al) but also as oxide ($Al_2O_3$). In either of the normal portion and the blackened portion, $Al_2O_3$ was present in a larger amount than Al, and the ratio between Al and $Al_2O_3$ was not largely different between the normal portion and the blackened portion.

As illustrated in FIGS. 4A and 4B, in the analysis of Mg in the normal portion and the blackened portion, peaks respectively assigned to metal Mg, $Mg(OH)_2$ and MgO at a binding energy of about 49 to 50 eV were observed. It is understood from the analysis results that Mg is present in the normal and blackened portions in the form of metal Mg, oxide (MgO), and hydroxide ($Mg(OH)_2$). The ratio among metal Mg, $Mg(OH)_2$, and MgO was not largely different between the normal portion and the blackened portion.

The foregoing results suggest that the bonding state of Zn affects the formation of a blackened portion, and that a possible cause of the blackened portion is an increase in the ratio of $Zn(OH)_2$.

Subsequently, the present inventors produced a hot-dip Zn alloy-plated steel sheet by contacting factory water (cooling water) with a surface of a hot-dip Zn alloy plating layer without forming a water film by using a mist cooling apparatus. The thus produced hot-dip Zn alloy-plated steel sheet was stored for 1 week within a room (at a temperature of 20° C. and a relative humidity of 60%). Then, the surface of the hot-dip Zn alloy-plated steel sheet thus stored for 1 week was visually observed, resulting in the finding that the hot-dip Zn alloy-plated steel sheet had uniform surface brightness, and that no dark portion (blackened portion) was formed. Furthermore, the degree of brightness of the surface of the plating layer was substantially equal to that of the normal portion of the hot-dip Zn alloy-plated steel sheet produced with a water film temporarily formed.

Figure 5:
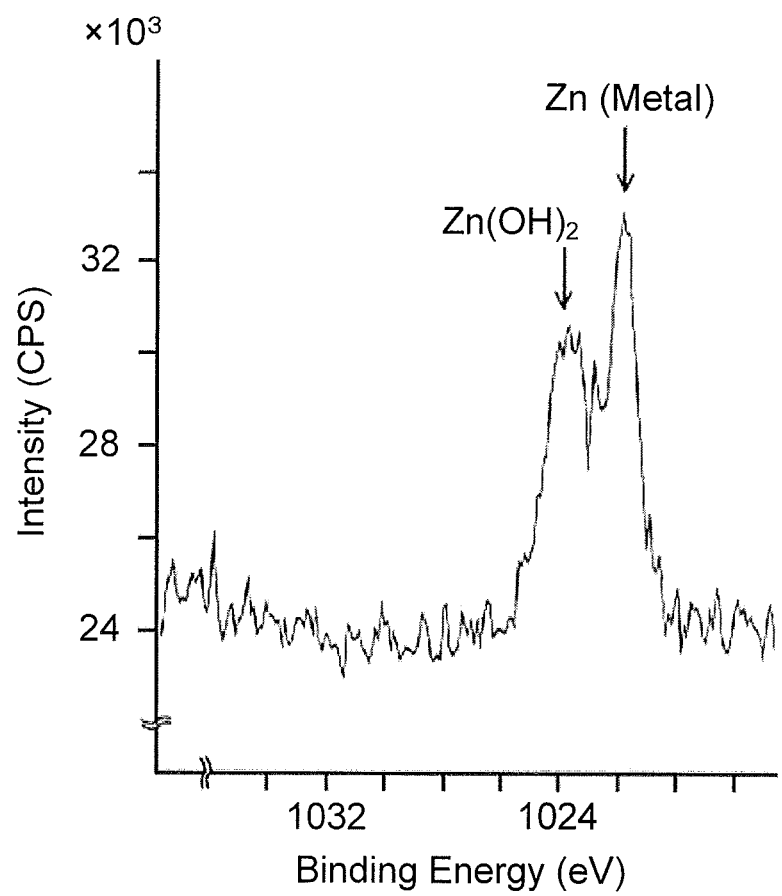
FIG. 5 is a diagram of an intensity profile of chemical binding energy corresponding to the 2p orbitals of Zn when a hot-dip Zn alloy plating layer is cooled by using water as cooling water without forming a water film.

Next, the hot-dip Zn alloy-plated steel sheet was analyzed by the XPS analysis immediately after production without forming a water film. FIG. 5 illustrates an intensity profile of chemical binding energy corresponding to the 2p orbitals of Zn. Intensity profiles of Al and Mg are omitted. As illustrated in FIG. 5, also in the case where cooling water is contacted without forming a water film, a peak assigned to metal Zn at a binding energy of about 1,020 eV and a peak assigned to $Zn(OH)_2$ at a binding energy of 1,022 eV were observed. It is understood, based on the intensity ratio between Zn and $Zn(OH)_2$, that Zn is present in a larger amount than $Zn(OH)_2$. On the basis of this finding, it is presumed that formation of $Zn(OH)_2$ is not promoted even when the cooling water comes into contact with the plating layer unless a water film is formed.

The foregoing results suggest that the formation of $Zn(OH)_2$ is affected by the formation of a water film in the cooling process. It is presumed that when a water film is not formed, $Zn(OH)_2$ is not easily formed and hence the blackening is suppressed.

As described above, the present inventors have found, with respect to the blackening of a plating layer of a hot-dip Zn alloy-plated steel sheet, that 1) $Zn(OH)_2$ may be formed on the surface of the plating layer depending upon production conditions (such as conditions for water quenching), and that 2) blackening easily occurs on the surface of the plating layer especially in a region where $Zn(OH)_2$ has been formed. Accordingly, the present inventors have presumed the mechanism of blackening in a plating layer as described below.

First, when cooling water comes into contact with the surface of a plating layer of a high temperature (e.g., about 160° C.), Zn is partially eluted from an oxide film formed on the surface of the plating layer or a Zn phase of the plating layer.

$$Zn \rightarrow Zn^{2+} + 2e^- \quad (1)$$

The resultant $Zn^{2+}$ binds to $OH^-$ present in the cooling water to form $Zn(OH)_2$ on the surface of the plating layer.

$$Zn^{2+} + 2OH^- \rightarrow Zn(OH)_2 \quad (2)$$

Thereafter, as the time elapses, a part of the $Zn(OH)_2$ present on the surface of the plating layer is changed to ZnO through a dehydration reaction.

$$Zn(OH)_2 \rightarrow ZnO + H_2O \quad (3)$$

Subsequently, a part of the ZnO is robbed of O by Al and Mg contained in the plating layer, and changed into $ZnO_{1-X}$. This $ZnO_{1-X}$ works as a color center and a corresponding portion visually looks black.

(Blackening Suppression Mechanism)

Next, the present inventors produced a hot-dip Zn alloy-plated steel sheet by using, instead of the factory water, a cooling aqueous solution containing a polyatomic ion including $V^{5+}$ in a concentration of 1.0 g/L, and by employing a spray water quenching zone with a water film temporarily formed on the surface of a plating layer. Here, the surface temperature of the hot-dip Zn alloy-plated steel sheet obtained immediately before being in contact with the cooling aqueous solution was estimated as about 160° C.

The thus produced hot-dip Zn alloy-plated steel sheet was stored for 1 week within a room (at a temperature of 20° C. and a relative humidity of 60%). After 1 week storage, the hot-dip Zn alloy-plated steel sheet was visually observed, and found that the hot-dip Zn alloy-plated steel sheet had substantially uniform surface brightness, and that no dark portion (blackened portion) was formed. Furthermore, the degree of brightness of the steel sheet was substantially equal to that of the normal portion of the hot-dip Zn alloy-plated steel sheet produced by using the factory water with a water film temporarily formed.

Figure 6:
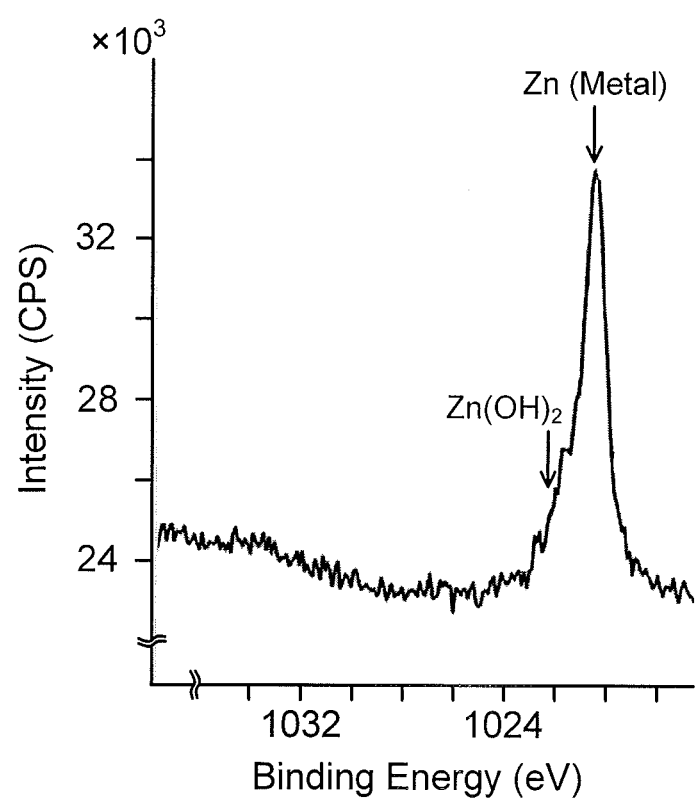
FIG. 6 is a diagram of an intensity profile of chemical binding energy corresponding to the 2p orbitals of Zn when a hot-dip Zn alloy plating layer is cooled by using a cooling aqueous solution containing $V^{5+}$ with a water film temporarily formed.

Next, the hot-dip Zn alloy-plated steel sheet was analyzed by the XPS analysis immediately after production, by using the cooling aqueous solution containing $V^{5+}$ with a water film temporarily formed. FIG. 6 illustrates an intensity profile, in a normal portion, of chemical binding energy corresponding to the 2p orbitals of Zn obtained in using the cooling aqueous solution containing $V^{5+}$. Intensity profiles of Al and Mg are omitted. As illustrated in FIG. 6, also in the case where the cooling aqueous solution containing $V^{5+}$ was used, a peak assigned to metal Zn at a binding energy of about 1,020 eV and a peak assigned to $Zn(OH)_2$ at a binding energy of about 1,022 eV were observed. It was found, based on the intensity ratio between Zn and $Zn(OH)_2$, that Zn was present in a larger amount than $Zn(OH)_2$. On the basis of the finding, it is presumed that formation of $Zn(OH)_2$ is not promoted when using the cooling aqueous solution containing $V^{5+}$ even when a water film is temporarily formed.

A presumed mechanism of suppression of blackening in the case where an aqueous solution containing a polyatomic ion including $V^{5+}$, $Si^{4+}$, or $Cr^{6+}$ is used as the cooling water will now be described by exemplifying use of $V^{5+}$. When a cooling aqueous solution containing, for example, a polyatomic ion including $V^{5+}$ is used, the $V^{5+}$ is reduced to form a dense passivation film between an oxide film formed on a surface of a plating layer and the cooling aqueous solution. Therefore, the elution of Zn from the oxide film to the cooling aqueous solution is suppressed. Accordingly, formation of $Zn(OH)_2$ is suppressed, thus suppressing the blackening of the plating layer.

The aforementioned method for producing a hot-dip Zn alloy-plated steel sheet of the present invention can be practiced on, for example, the following production line.

Figure 7:
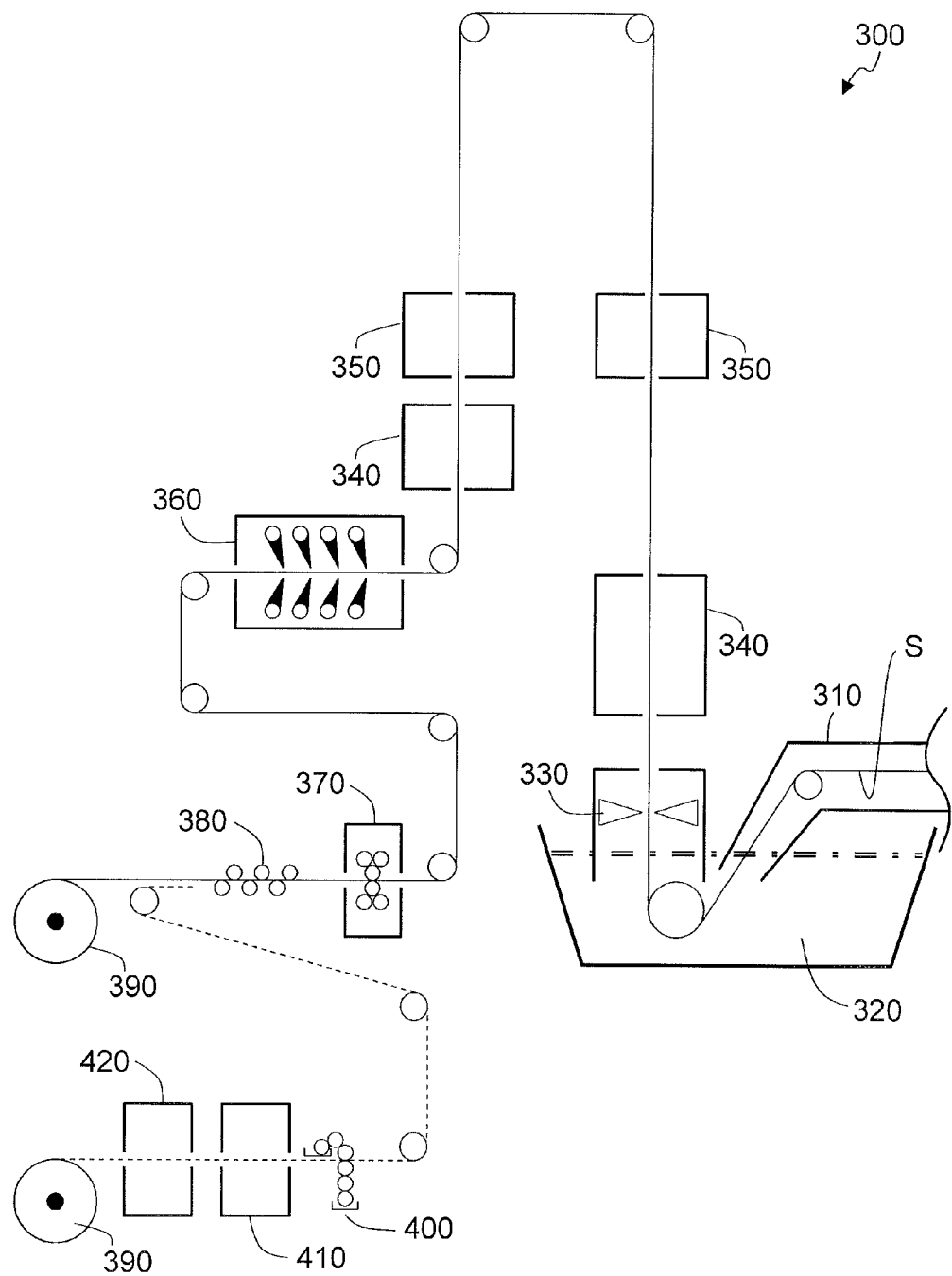
FIG. 7 is a schematic diagram illustrating the structure of a part of a production line for hot-dip Zn alloy-plated steel sheets.

FIG. 7 is a schematic diagram illustrating a part of production line 300 for hot-dip Zn alloy-plated steel sheets. Production line 300 can continuously produce hot-dip Zn alloy-plated steel sheets by forming a plating layer on a surface of a base steel sheet (steel strip). Production line 300 can also continuously produce chemical conversion coated steel sheets by further forming a chemical conversion coating on a surface of the plating layer as necessary.

As illustrated in FIG. 7, production line 300 includes furnace 310, plating bath 320, air jet cooler 340, mist cooling zone 350, water quenching zone 360, skin pass mill 370, and tension leveler 380.

Steel strip S drawn out from a supply reel not shown is heated in furnace 310 after a predetermined process. Steel strip S thus heated is immersed in plating bath 320, so that a molten metal coats both sides of steel strip S. Subsequently, an excessive portion of the molten metal is removed by a wiping apparatus having wiping nozzles 330, so that a predetermined amount of molten metal coats the surface of steel strip S.

Steel strip S coated with the predetermined amount of molten metal is cooled in air jet cooler 340 and mist cooling zone 350 to a temperature equal to or less than a solidifying point of the molten metal. Air jet cooler 340 is equipment provided for purpose of cooling steel strip S by blowing air. Also, mist cooling zone 350 is equipment provided for purpose of cooling steel strip S by blowing a mist of a fluid (such as cooling water) and a gas. Thus, the molten metal is solidified, so that a hot-dip Zn alloy plating layer can be formed on the surface of steel strip S. When steel strip S is cooled in mist cooling zone 350, no water film is formed on a surface of the plating layer. The temperature after cooling is not especially limited, and is, for example, 100 to 250° C.

The hot-dip Zn alloy-plated steel sheet having been cooled to a predetermined temperature is further cooled in water quenching zone 360. Water quenching zone 360 is equipment provided for purpose of cooling steel strip S through a contact with cooling water in a larger amount than in mist cooling zone 350, and supplies water in an amount sufficient for temporarily forming a water film on the surface of the plating layer. In water quenching zone 360, for example, seven rows of headers, each having ten flat spray nozzles arranged at an interval of 150 mm along the widthwise direction of steel strip S, are disposed along the feed direction of base steel sheet S. In water quenching zone 360, an aqueous solution containing, in a total amount of 0.01 g/L or more in terms of atom, one of or two or more of polyatomic ions selected from the group consisting of a polyatomic ion including $V^{5+}$, a polyatomic ion including $Si^{4+}$, and a polyatomic ion including $Cr^{6+}$ is used as a cooling aqueous solution. Steel strip S is cooled in this water quenching zone 360 while being supplied with the cooling water in an amount sufficient to temporarily form a water film on the surface of the plating layer. The cooling aqueous solution has, for example, a temperature of about 20° C., a pressure of about 2.5 kgf/cm$^2$, and a flow rate of about 150 m$^3$/h. By "temporarily form a water film" is meant a status where water in contact with the hot-dip Zn alloy-plated steel sheet can be visually observed for about 1 second or longer.

The hot-dip Zn alloy-plated steel sheet thus cooled with water is temper-rolled by skin pass mill 370 and leveled by tension leveler 380, and then wound around tension reel 390.

In the case where a chemical conversion coating is to be further formed on the surface of the plating layer, a predetermined chemical conversion treatment liquid is applied by roll coater 400 on the surface of the hot-dip Zn alloy-plated steel sheet leveled by tension leveler 380. The hot-dip Zn alloy-plated steel sheet subjected to the chemical conversion treatment is dried in drying zone 410 and cooled in air cooling zone 420, and then wound around tension reel 390.

As described so far, according to the method for producing a hot-dip Zn alloy-plated steel sheet of the present invention, a hot-dip Zn alloy-plated steel sheet having excellent blackening resistance can be easily produced with high productivity merely by contacting an aqueous solution containing a predetermined polyatomic ion with the surface of a hot-dip Zn alloy plating layer.

EXAMPLES

Experiment 1

In Experiment 1, blackening resistance of a hot-dip Zn alloy plating layer was evaluated for a hot-dip Zn alloy-plated steel sheet cooled with cooling water not containing a polyatomic ion.

1. Production of Hot-Dip Zn Alloy-Plated Steel Sheet

A hot-dip Zn alloy-plated steel sheet was produced by using production line 300 illustrated in FIG. 7. As base steel sheet (steel strip) S, hot-rolled steel strips with a thickness of 2.3 mm were provided. Eight different hot-dip Zn alloy-plated steel sheets with plating layers having different compositions were produced by plating the base steel sheets using plating bath compositions and plating conditions shown in Table 1. It is noted that the composition of the plating bath substantially accords with the composition of the resulting plating layer. Although not especially illustrated, an [Al/Zn/$Zn_2$Mg ternary eutectic structure] was found, through observation of a cross section of the plating layer, in each of the hot-dip Zn alloy-plated steel sheets.

TABLE 1

| Plating No. | Plating bath composition (with balance of Zn) (% by mass) | | | | | Plating conditions | | |
|---|---|---|---|---|---|---|---|---|
| | Al | Mg | Si | Ti | B | Bath temperature (° C.) | Coating amount (g/m²) | Passing speed (m/min) |
| 1 | 1.5 | 1.5 | — | — | — | 430 | 90 | 80 |
| 2 | 2.5 | 3.0 | — | — | — | 430 | 90 | 80 |
| 3 | 2.5 | 3.0 | 0.040 | — | — | 430 | 90 | 80 |
| 4 | 6.0 | 3.0 | — | 0.050 | 0.003 | 430 | 90 | 80 |
| 5 | 6.0 | 3.0 | 0.020 | 0.050 | 0.003 | 430 | 90 | 80 |
| 6 | 11.0 | 3.0 | — | — | — | 450 | 90 | 80 |
| 7 | 11.0 | 3.0 | 0.200 | — | — | 450 | 90 | 80 |
| 8 | 18.0 | 8.0 | — | — | — | 470 | 90 | 80 |

In the production of the hot-dip Zn alloy-plated steel sheets, the cooling conditions employed in air jet cooler 340 and mist cooling zone 350 were changed, so that the temperature of the steel sheet (plating layer surface) immediately before entering water quenching zone 360 could be adjusted to 100° C., 120° C., 160° C., 200° C., or 250° C. In a spray apparatus used in water quenching zone 360, seven rows of headers, each having ten flat spray nozzles arranged at an interval of 150 mm along the widthwise direction, were disposed along the feed direction of base steel sheet S. The cooling conditions employed in water quenching zone 360 were: water (of pH 7.6 and a temperature of 20° C.) used as cooling water, a water pressure of 2.5 kgf/cm², and a flow rate of 150 m³/h.

2. Evaluation of Hot-Dip Zn Alloy-Plated Steel Sheets (1) Brightness Degradation Accelerating Process A test piece was cut out from each of the produced hot-dip Zn alloy-plated steel sheets. With each test piece put in a thermo-hygrostat (LHU-113; ESPEC CORP.), a process for accelerating brightness degradation was performed under each of conditions shown in Table 2. In the test conditions No. 2, the processing time is longer than in the test conditions No. 1, and hence, the test conditions No. 2 are severer than the test conditions No. 1.

TABLE 2

| Brightness degradation accelerating conditions No. | Temperature (° C.) | Relative humidity (%) | Processing time (h) |
|---|---|---|---|
| 1 | 60 | 90 | 20 |
| 2 | 60 | 90 | 40 |

(2) Measurement of Blackening Degree

In each of the hot-dip Zn alloy-plated steel sheets, lightness (L* value) of a surface of the plating layer was measured before and after the brightness degradation accelerating process. The lightness (L* value) of the surface of the plating layer was measured by using a spectroscopic color difference meter (TC-1800; Tokyo Denshoku Co., Ltd.) by a spectroscopic reflection measurement method according to JIS K 5600. The measurement conditions were as follows:

Optical condition: d/8° method (double-beam optical system)
Visual angle: 2 degrees
Measurement method: reflectometry
Standard light source: C
Color system: CIELAB
Measurement wavelength: 380 to 780 nm
Measurement wavelength interval: 5 nm
Spectrometer: diffraction grating 1,200/mm
Light source: halogen lamp (with a rated voltage of 12 V, rated power of 50 W, and a rated life of 2,000 hrs.)
Measurement area: 7.25 mm diameter
Sensor: photomultiplier (R928; Hamamatsu Photonics K.K.)
Reflectance: 0-150%
Measurement temperature: 23° C.
Standard plate: white Each of the plated steel sheets was evaluated as "A" when a difference in the L* value (ΔL*) caused through the brightness degradation accelerating process was less than 0.5, evaluated as "B" when the difference was 0.5 or more and less than 3, or evaluated as "C" when the difference was 3 or more. It can be determined that a plated steel sheet evaluated as "A" has blackening resistance.

(3) Evaluation Results

With respect to each of the plated steel sheets, the relationships among the brightness degradation accelerating conditions, the temperature of the steel sheet (the surface of the plating layer) immediately before cooling in water quenching zone 360 and the evaluation result for the blackening degree are shown in Table 3.

TABLE 3

| Test piece No. | Plating No. | Brightness degradation accelerating conditions No. | Surface temperature of plated steel sheet immediately before cooling in water quenching zone (° C.) | | | | | Remark |
|---|---|---|---|---|---|---|---|---|
| | | | 100 | 120 | 160 | 200 | 250 | |
| A-1 | 1 | 1 | A | B | C | C | C | Comparative Example |
| A-2 | 2 | 1 | A | B | C | C | C | Comparative Example |

TABLE 3-continued

| Test piece No. | Plating No. | Brightness degradation accelerating conditions No. | Surface temperature of plated steel sheet immediately before cooling in water quenching zone (° C.) | | | | | Remark |
|---|---|---|---|---|---|---|---|---|
| | | | 100 | 120 | 160 | 200 | 250 | |
| A-3 | 3 | 1 | A | A | A | A | A | Comparative Example |
| A-4 | 4 | 1 | A | B | C | C | C | Comparative Example |
| A-5 | 5 | 1 | A | A | A | A | A | Comparative Example |
| A-6 | 6 | 1 | A | B | C | C | C | Comparative Example |
| A-7 | 7 | 1 | A | A | A | A | A | Comparative Example |
| A-8 | 8 | 1 | A | B | C | C | C | Comparative Example |
| B-1 | 1 | 2 | C | C | C | C | C | Comparative Example |
| B-2 | 2 | 2 | C | C | C | C | C | Comparative Example |
| B-3 | 3 | 2 | A | A | B | C | C | Comparative Example |
| B-4 | 4 | 2 | C | C | C | C | C | Comparative Example |
| B-5 | 5 | 2 | A | B | C | C | C | Comparative Example |
| B-6 | 6 | 2 | C | C | C | C | C | Comparative Example |
| B-7 | 7 | 2 | A | A | B | C | C | Comparative Example |
| B-8 | 8 | 2 | C | C | C | C | C | Comparative Example |

In the case where the brightness degradation accelerating process was performed under the conditions No. 1, test pieces having plating layers containing Si (plating Nos. 3, 5, and 7) had good blackening resistance even when the temperature of the steel sheets immediately before cooling in water quenching zone 360 was 250° C. On the other hand, test pieces having plating layers not containing Si (plating Nos. 1, 2, 4, 6, and 8) were blackened when the temperature of the steel sheets immediately before cooling in water quenching zone 360 was 120° C. or more.

On the other hand, in the case where the brightness degradation accelerating process was performed under the conditions No. 2, even a test piece having a plating layer containing Si was blackened when the temperature of the steel sheet immediately before cooling in water quenching zone 360 was 120° C. or above. A test piece having a plating layer not containing Si was blackened even when the temperature of the steel sheet immediately before cooling in water quenching zone 360 was 100° C.

It is understood, based on the aforementioned results, that when Si is not contained in the plating layer, blackening cannot be prevented unless the temperature of a steel sheet immediately before cooling in water quenching zone 360 is sufficiently lowered. It is also understood that even when a plating layer contains Si, blackening cannot be completely prevented in employing the severer conditions unless the temperature of a steel sheet immediately before cooling in water quenching zone 360 is sufficiently lowered.

Experiment 2

In Experiment 2, blackening resistance of a hot-dip Zn alloy plating layer was examined for a hot-dip Zn alloy-plated steel sheet cooled with a cooling aqueous solution containing a polyatomic ion was examined. In this experiment, the blackening resistance attained in performing the brightness degradation accelerating process under the conditions No. 1 was examined.

1. Production of Hot-Dip Zn Alloy-Plated Steel Sheets

In the same manner as in Experiment 1, eight different hot-dip Zn alloy-plated steel sheets with plating layers having different compositions were produced by plating base steel sheets using plating bath compositions and plating conditions shown in Table 1.

In the production of the hot-dip Zn alloy-plated steel sheets, the cooling conditions employed in air jet cooler 340 were changed, so that the temperature of the steel sheet (plating layer surface) immediately before entering water quenching zone 360 could be adjusted to 100° C., 120° C., 160° C., 200° C., or 250° C. In water quenching zone 360, any one of the aqueous solutions shown in Table 4 was used as the cooling aqueous solution. Each cooling aqueous solution was prepared by dissolving an additive shown in Table 4, and a dissolution promoter if necessary, in water of pH 7.6 in a predetermined ratio, and adjusting the temperature of the resulting solution to 20° C. Each cooling aqueous solution was supplied, in water quenching zone 360, under conditions of a water pressure of 2.5 kgf/cm² and a flow rate of 150 m³/h. As the concentration of the polyatomic ion in each aqueous solution, five concentrations, in terms of atom used as ionic species, as shown in Table 5 were prepared.

TABLE 4

| Cooling aqueous solution No. | Additive | Dissolution promoter | Ratio in addition amount (dissolution promoter/additive) | Ionic species |
|---|---|---|---|---|
| 1 | Magnesium sulfate | — | — | $Mg^{2+}$ |
| 2 | Aluminum chloride | — | — | $Al^{3+}$ |
| 3 | Sodium silicate | — | — | $Si^{4+}$ |
| 4 | Calcium formate | — | — | $Ca^{2+}$ |
| 5 | Calcium gluconate | — | — | $Ca^{2+}$ |
| 6 | Calcium acetate | — | — | $Ca^{2+}$ |
| 7 | Calcium lactate | — | — | $Ca^{2+}$ |
| 8 | Vanadium acetylacetonate | — | — | $V^{3+}$ |
| 9 | Acetylacetone vanadyl | — | — | $V^{4+}$ |
| 10 | Vanadium oxysulfate | — | — | $V^{4+}$ |
| 11 | Vanadium pentoxide | 2-Aminoethanol | 1.2 | $V^{5+}$ |
| 12 | Vanadium pentoxide | Tetraethyl ammonium hydroxide | 1.3 | $V^{5+}$ |
| 13 | Vanadium pentoxide | 2,2'-Iminodiethanol | 1.2 | $V^{5+}$ |
| 14 | Vanadium acetylacetonate | Ethylene diamine | 1.0 | $V^{5+}$ |
| 15 | Acetylacetone vanadyl | Ethylene diamine | 1.1 | $V^{5+}$ |
| 16 | Vanadium oxysulfate | 2-Aminoethanol | 1.2 | $V^{5+}$ |
| 17 | Ammonium chromate | — | — | $Cr^{6+}$ |
| 18 | Potassium chromate | — | — | $Cr^{6+}$ |
| 19 | Chromium nitrate | — | — | $Cr^{3+}$ |
| 20 | Chromium sulfate | — | — | $Cr^{3+}$ |

TABLE 4-continued

| Cooling aqueous solution No. | Additive | Dissolution promoter | Ratio in addition amount (dissolution promoter/additive) | Ionic species |
|---|---|---|---|---|
| 21 | Manganese sulfate | — | — | $Mn^{2+}$ |
| 22 | Potassium permanganate | — | — | $Mn^{7+}$ |
| 23 | Iron chloride | — | — | $Fe^{3+}$ |
| 24 | Cobalt sulfate | — | — | $Co^{2+}$ |
| 25 | Nickel nitrate | — | — | $Ni^{2+}$ |
| 26 | Copper chloride | — | — | $Cu^{2+}$ |
| 27 | Zinc peroxide | — | — | $Zn^{2+}$ |
| 28 | Zinc oxide | — | — | $Zn^{2+}$ |
| 29 | Zinc fluoride | — | — | $Zn^{2+}$ |
| 30 | Zirconium sulfate | — | — | $Zr^{4+}$ |
| 31 | Ammonium zirconium carbonate | — | — | $Zr^{4+}$ |

TABLE 5

| Sign | Concentration of polyatomic ion (g/L) |
|---|---|
| a | 0.001 |
| b | 0.01 |
| c | 0.1 |
| d | 1.0 |
| e | 10.0 |

2. Evaluation of Hot-Dip Zn Alloy-Plated Steel Sheets (1) Brightness Degradation Accelerating Process and Measurement of Blackening Degree Each of the hot-dip Zn alloy-plated steel sheets was subjected to the brightness degradation accelerating process under the conditions No. 1 shown in Table 2. Furthermore, the lightness (L* value) of the surface of the plating layer of each hot-dip Zn alloy-plated steel sheet was measured before and after the brightness degradation accelerating process in the same manner as in Experiment 1.

A correspondence between the plating No. of each of the evaluated hot-dip Zn alloy-plated steel sheet and the concentration(s) of the additive in the used cooling aqueous solution is shown in Table 6. The results are shown in tables listed in Table 6.

TABLE 6

| Plating No. | Concentration of polyatomic ion (in terms of atom; g/L) | | | | |
|---|---|---|---|---|---|
| | 0.001 | 0.01 | 0.1 | 1.0 | 10 |
| 1 | — | Table 7 | — | — | — |
| 2 | — | Table 8 | — | — | — |
| 3 | — | Table 9 | — | — | — |
| 4 | Table 10 | Table 11 | Table 12 | Table 13 | Table 14 |
| 5 | — | Table 15 | — | — | — |
| 6 | — | Table 16 | — | — | — |
| 7 | — | Table 17 | — | — | — |
| 8 | — | Table 18 | — | — | — |

(2) Evaluation Results

With respect to each of the plated steel sheets, the relationships among the kind of cooling aqueous solution used, the temperature of the steel sheet (plating layer surface) immediately before cooling in water quenching zone 360 and the evaluation result of the blackening degree are shown in Tables 7 to 18.

It is noted that "Test piece No." shown in each of these tables is defined in accordance with the following rule so that the experiment contents can be easily understood: Each test piece No. is determined as "(the brightness degradation accelerating conditions No.; see Table 2)—(the plating No.; see Table 1)—(the cooling aqueous solution No. and the sign for the concentration of a polyatomic ion; see Tables 4 and 5)."

TABLE 7

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 1-1-1b | 1 | A | A | B | C | C | Comparative Example |
| 1-1-2b | 2 | A | B | C | C | C | Comparative Example |
| 1-1-3b | 3 | A | A | A | A | A | Example |
| 1-1-4b | 4 | A | A | B | C | C | Comparative Example |
| 1-1-5b | 5 | A | A | B | C | C | Comparative Example |
| 1-1-6b | 6 | A | A | B | C | C | Comparative Example |
| 1-1-7b | 7 | A | A | B | C | C | Comparative Example |
| 1-1-8b | 8 | A | B | C | C | C | Comparative Example |
| 1-1-9b | 9 | A | B | C | C | C | Comparative Example |
| 1-1-10b | 10 | A | B | C | C | C | Comparative Example |
| 1-1-11b | 11 | A | A | A | A | A | Example |
| 1-1-12b | 12 | A | A | A | A | A | Example |
| 1-1-13b | 13 | A | A | A | A | A | Example |
| 1-1-14b | 14 | A | A | A | A | A | Example |
| 1-1-15b | 15 | A | A | A | A | A | Example |
| 1-1-16b | 16 | A | A | A | A | A | Example |
| 1-1-17b | 17 | A | A | A | A | A | Example |
| 1-1-18b | 18 | A | A | A | A | A | Example |
| 1-1-19b | 19 | A | B | C | C | C | Comparative Example |
| 1-1-20b | 20 | A | B | C | C | C | Comparative Example |
| 1-1-21b | 21 | A | A | B | C | C | Comparative Example |
| 1-1-22b | 22 | A | B | C | C | C | Comparative Example |
| 1-1-23b | 23 | A | B | C | C | C | Comparative Example |
| 1-1-24b | 24 | A | B | C | C | C | Comparative Example |
| 1-1-25b | 25 | A | B | C | C | C | Comparative Example |
| 1-1-26b | 26 | A | B | C | C | C | Comparative Example |
| 1-1-27b | 27 | A | A | B | C | C | Comparative Example |

TABLE 7-continued

| Test piece No. | Cooling aqueous solution No. | 100 | 120 | 160 | 200 | 250 | Remark |
| --- | --- | --- | --- | --- | --- | --- | --- |
| 1-1-28b | 28 | A | A | B | C | C | Comparative Example |
| 1-1-29b | 29 | A | A | B | C | C | Comparative Example |
| 1-1-30b | 30 | A | B | C | C | C | Comparative Example |
| 1-1-31b | 31 | A | B | C | C | C | Comparative Example |

TABLE 8

| Test piece No. | Cooling aqueous solution No. | 100 | 120 | 160 | 200 | 250 | Remark |
| --- | --- | --- | --- | --- | --- | --- | --- |
| 1-2-1b | 1 | A | A | B | C | C | Comparative Example |
| 1-2-2b | 2 | A | B | C | C | C | Comparative Example |
| 1-2-3b | 3 | A | A | A | A | A | Example |
| 1-2-4b | 4 | A | A | B | C | C | Comparative Example |
| 1-2-5b | 5 | A | A | B | C | C | Comparative Example |
| 1-2-6b | 6 | A | A | B | C | C | Comparative Example |
| 1-2-7b | 7 | A | A | B | C | C | Comparative Example |
| 1-2-8b | 8 | A | B | C | C | C | Comparative Example |
| 1-2-9b | 9 | A | B | C | C | C | Comparative Example |
| 1-2-10b | 10 | A | B | C | C | C | Comparative Example |
| 1-2-11b | 11 | A | A | A | A | A | Example |
| 1-2-12b | 12 | A | A | A | A | A | Example |
| 1-2-13b | 13 | A | A | A | A | A | Example |
| 1-2-14b | 14 | A | A | A | A | A | Example |
| 1-2-15b | 15 | A | A | A | A | A | Example |
| 1-2-16b | 16 | A | A | A | A | A | Example |
| 1-2-17b | 17 | A | A | A | A | A | Example |
| 1-2-18b | 18 | A | A | A | A | A | Example |
| 1-2-19b | 19 | A | B | C | C | C | Comparative Example |
| 1-2-20b | 20 | A | B | C | C | C | Comparative Example |
| 1-2-21b | 21 | A | A | B | C | C | Comparative Example |
| 1-2-22b | 22 | A | B | C | C | C | Comparative Example |
| 1-2-23b | 23 | A | B | C | C | C | Comparative Example |
| 1-2-24b | 24 | A | B | C | C | C | Comparative Example |
| 1-2-25b | 25 | A | B | C | C | C | Comparative Example |
| 1-2-26b | 26 | A | B | C | C | C | Comparative Example |
| 1-2-27b | 27 | A | A | B | C | C | Comparative Example |
| 1-2-28b | 28 | A | A | B | C | C | Comparative Example |
| 1-2-29b | 29 | A | A | B | C | C | Comparative Example |
| 1-2-30b | 30 | A | B | C | C | C | Comparative Example |
| 1-2-31b | 31 | A | B | C | C | C | Comparative Example |

TABLE 9

| Test piece No. | Cooling aqueous solution No. | 100 | 120 | 160 | 200 | 250 | Remark |
| --- | --- | --- | --- | --- | --- | --- | --- |
| 1-3-1b | 1 | A | A | A | A | A | Comparative Example |
| 1-3-2b | 2 | A | A | A | A | A | Comparative Example |
| 1-3-3b | 3 | A | A | A | A | A | Example |
| 1-3-4b | 4 | A | A | A | A | A | Comparative Example |
| 1-3-5b | 5 | A | A | A | A | A | Comparative Example |
| 1-3-6b | 6 | A | A | A | A | A | Comparative Example |
| 1-3-7b | 7 | A | A | A | A | A | Comparative Example |
| 1-3-8b | 8 | A | A | A | A | A | Comparative Example |
| 1-3-9b | 9 | A | A | A | A | A | Comparative Example |
| 1-3-10b | 10 | A | A | A | A | A | Comparative Example |
| 1-3-11b | 11 | A | A | A | A | A | Example |
| 1-3-12b | 12 | A | A | A | A | A | Example |

TABLE 9-continued

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 1-3-13b | 13 | A | A | A | A | A | Example |
| 1-3-14b | 14 | A | A | A | A | A | Example |
| 1-3-15b | 15 | A | A | A | A | A | Example |
| 1-3-16b | 16 | A | A | A | A | A | Example |
| 1-3-17b | 17 | A | A | A | A | A | Example |
| 1-3-18b | 18 | A | A | A | A | A | Example |
| 1-3-19b | 19 | A | A | A | A | A | Comparative Example |
| 1-3-20b | 20 | A | A | A | A | A | Comparative Example |
| 1-3-21b | 21 | A | A | A | A | A | Comparative Example |
| 1-3-22b | 22 | A | A | A | A | A | Comparative Example |
| 1-3-23b | 23 | A | A | A | A | A | Comparative Example |
| 1-3-24b | 24 | A | A | A | A | A | Comparative Example |
| 1-3-25b | 25 | A | A | A | A | A | Comparative Example |
| 1-3-26b | 26 | A | A | A | A | A | Comparative Example |
| 1-3-27b | 27 | A | A | A | A | A | Comparative Example |
| 1-3-28b | 28 | A | A | A | A | A | Comparative Example |
| 1-3-29b | 29 | A | A | A | A | A | Comparative Example |
| 1-3-30b | 30 | A | A | A | A | A | Comparative Example |
| 1-3-31b | 31 | A | A | A | A | A | Comparative Example |

TABLE 10

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 1-4-1a | 1 | A | B | C | C | C | Comparative Example |
| 1-4-2a | 2 | A | B | C | C | C | Comparative Example |
| 1-4-3a | 3 | A | B | C | C | C | Comparative Example |
| 1-4-4a | 4 | A | B | C | C | C | Comparative Example |
| 1-4-5a | 5 | A | B | C | C | C | Comparative Example |
| 1-4-6a | 6 | A | B | C | C | C | Comparative Example |
| 1-4-7a | 7 | A | B | C | C | C | Comparative Example |
| 1-4-8a | 8 | A | B | C | C | C | Comparative Example |
| 1-4-9a | 9 | A | B | C | C | C | Comparative Example |
| 1-4-10a | 10 | A | B | C | C | C | Comparative Example |
| 1-4-11a | 11 | A | B | C | C | C | Comparative Example |
| 1-4-12a | 12 | A | B | C | C | C | Comparative Example |
| 1-4-13a | 13 | A | B | C | C | C | Comparative Example |
| 1-4-14a | 14 | A | B | C | C | C | Comparative Example |
| 1-4-15a | 15 | A | B | C | C | C | Comparative Example |
| 1-4-16a | 16 | A | B | C | C | C | Comparative Example |
| 1-4-17a | 17 | A | B | C | C | C | Comparative Example |
| 1-4-18a | 18 | A | B | C | C | C | Comparative Example |
| 1-4-19a | 19 | A | B | C | C | C | Comparative Example |
| 1-4-20a | 20 | A | B | C | C | C | Comparative Example |
| 1-4-21a | 21 | A | B | C | C | C | Comparative Example |
| 1-4-22a | 22 | A | B | C | C | C | Comparative Example |
| 1-4-23a | 23 | A | B | C | C | C | Comparative Example |
| 1-4-24a | 24 | A | B | C | C | C | Comparative Example |
| 1-4-25a | 25 | A | B | C | C | C | Comparative Example |
| 1-4-26a | 26 | A | B | C | C | C | Comparative Example |
| 1-4-27a | 27 | A | B | C | C | C | Comparative Example |
| 1-4-28a | 28 | A | B | C | C | C | Comparative Example |
| 1-4-29a | 29 | A | B | C | C | C | Comparative Example |
| 1-4-30a | 30 | A | B | C | C | C | Comparative Example |
| 1-4-31a | 31 | A | B | C | C | C | Comparative Example |

TABLE 11

| Test piece No. | Cooling aqueous solution No. | 100 | 120 | 160 | 200 | 250 | Remark |
|---|---|---|---|---|---|---|---|
| 1-4-1b | 1 | A | A | B | C | C | Comparative Example |
| 1-4-2b | 2 | A | B | C | C | C | Comparative Example |
| 1-4-3b | 3 | A | A | A | A | A | Example |
| 1-4-4b | 4 | A | A | B | C | C | Comparative Example |
| 1-4-5b | 5 | A | A | B | C | C | Comparative Example |
| 1-4-6b | 6 | A | A | B | C | C | Comparative Example |
| 1-4-7b | 7 | A | A | B | C | C | Comparative Example |
| 1-4-8b | 8 | A | B | C | C | C | Comparative Example |
| 1-4-9b | 9 | A | B | C | C | C | Comparative Example |
| 1-4-10b | 10 | A | B | C | C | C | Comparative Example |
| 1-4-11b | 11 | A | A | A | A | A | Example |
| 1-4-12b | 12 | A | A | A | A | A | Example |
| 1-4-13b | 13 | A | A | A | A | A | Example |
| 1-4-14b | 14 | A | A | A | A | A | Example |
| 1-4-15b | 15 | A | A | A | A | A | Example |
| 1-4-16b | 16 | A | A | A | A | A | Example |
| 1-4-17b | 17 | A | A | A | A | A | Example |
| 1-4-18b | 18 | A | A | A | A | A | Example |
| 1-4-19b | 19 | A | B | C | C | C | Comparative Example |
| 1-4-20b | 20 | A | B | C | C | C | Comparative Example |
| 1-4-21b | 21 | A | A | B | C | C | Comparative Example |
| 1-4-22b | 22 | A | B | C | C | C | Comparative Example |
| 1-4-23b | 23 | A | B | C | C | C | Comparative Example |
| 1-4-24b | 24 | A | B | C | C | C | Comparative Example |
| 1-4-25b | 25 | A | B | C | C | C | Comparative Example |
| 1-4-26b | 26 | A | B | C | C | C | Comparative Example |
| 1-4-27b | 27 | A | A | B | C | C | Comparative Example |
| 1-4-28b | 28 | A | A | B | C | C | Comparative Example |
| 1-4-29b | 29 | A | A | B | C | C | Comparative Example |
| 1-4-30b | 30 | A | B | C | C | C | Comparative Example |
| 1-4-31b | 31 | A | B | C | C | C | Comparative Example |

Surface temperature of plated steel sheet immediately before cooling in water quenching zone (° C.)

TABLE 12

| Test piece No. | Cooling aqueous solution No. | 100 | 120 | 160 | 200 | 250 | Remark |
|---|---|---|---|---|---|---|---|
| 1-4-1c | 1 | A | A | B | C | C | Comparative Example |
| 1-4-2c | 2 | A | B | C | C | C | Comparative Example |
| 1-4-3c | 3 | A | A | A | A | A | Example |
| 1-4-4c | 4 | A | A | B | C | C | Comparative Example |
| 1-4-5c | 5 | A | A | B | C | C | Comparative Example |
| 1-4-6c | 6 | A | A | B | C | C | Comparative Example |
| 1-4-7c | 7 | A | A | B | C | C | Comparative Example |
| 1-4-8c | 8 | A | B | C | C | C | Comparative Example |
| 1-4-9c | 9 | A | B | C | C | C | Comparative Example |
| 1-4-10c | 10 | A | B | C | C | C | Comparative Example |
| 1-4-11c | 11 | A | A | A | A | A | Example |
| 1-4-12c | 12 | A | A | A | A | A | Example |
| 1-4-13c | 13 | A | A | A | A | A | Example |
| 1-4-14c | 14 | A | A | A | A | A | Example |
| 1-4-15c | 15 | A | A | A | A | A | Example |
| 1-4-16c | 16 | A | A | A | A | A | Example |
| 1-4-17c | 17 | A | A | A | A | A | Example |
| 1-4-18c | 18 | A | A | A | A | A | Example |
| 1-4-19c | 19 | A | B | C | C | C | Comparative Example |
| 1-4-20c | 20 | A | B | C | C | C | Comparative Example |
| 1-4-21c | 21 | A | A | B | C | C | Comparative Example |
| 1-4-22c | 22 | A | B | C | C | C | Comparative Example |
| 1-4-23c | 23 | A | B | C | C | C | Comparative Example |
| 1-4-24c | 24 | A | B | C | C | C | Comparative Example |
| 1-4-25c | 25 | A | B | C | C | C | Comparative Example |
| 1-4-26c | 26 | A | B | C | C | C | Comparative Example |
| 1-4-27c | 27 | A | A | B | C | C | Comparative Example |
| 1-4-28c | 28 | A | A | B | C | C | Comparative Example |

Surface temperature of plated steel sheet immediately before cooling in water quenching zone (° C.)

TABLE 12-continued

| Test piece No. | Cooling aqueous solution No. | \multicolumn{5}{c|}{Surface temperature of plated steel sheet immediately before cooling in water quenching zone (° C.)} | Remark |
| --- | --- | --- | --- | --- | --- | --- | --- |
| | | 100 | 120 | 160 | 200 | 250 | |
| 1-4-29c | 29 | A | A | B | C | C | Comparative Example |
| 1-4-30c | 30 | A | B | C | C | C | Comparative Example |
| 1-4-31c | 31 | A | B | C | C | C | Comparative Example |

TABLE 13

| Test piece No. | Cooling aqueous solution No. | \multicolumn{5}{c|}{Surface temperature of plated steel sheet immediately before cooling in water quenching zone (° C.)} | Remark |
| --- | --- | --- | --- | --- | --- | --- | --- |
| | | 100 | 120 | 160 | 200 | 250 | |
| 1-4-1d | 1 | A | A | B | C | C | Comparative Example |
| 1-4-2d | 2 | A | B | C | C | C | Comparative Example |
| 1-4-3d | 3 | A | A | A | A | A | Example |
| 1-4-4d | 4 | A | A | B | C | C | Comparative Example |
| 1-4-5d | 5 | A | A | B | C | C | Comparative Example |
| 1-4-6d | 6 | A | A | B | C | C | Comparative Example |
| 1-4-7d | 7 | A | A | B | C | C | Comparative Example |
| 1-4-8d | 8 | A | B | C | C | C | Comparative Example |
| 1-4-9d | 9 | A | B | C | C | C | Comparative Example |
| 1-4-10d | 10 | A | B | C | C | C | Comparative Example |
| 1-4-11d | 11 | A | A | A | A | A | Example |
| 1-4-12d | 12 | A | A | A | A | A | Example |
| 1-4-13d | 13 | A | A | A | A | A | Example |
| 1-4-14d | 14 | A | A | A | A | A | Example |
| 1-4-15d | 15 | A | A | A | A | A | Example |
| 1-4-16d | 16 | A | A | A | A | A | Example |
| 1-4-17d | 17 | A | A | A | A | A | Example |
| 1-4-18d | 18 | A | A | A | A | A | Example |
| 1-4-19d | 19 | A | B | C | C | C | Comparative Example |
| 1-4-20d | 20 | A | B | C | C | C | Comparative Example |
| 1-4-21d | 21 | A | B | B | C | C | Comparative Example |
| 1-4-22d | 22 | A | B | C | C | C | Comparative Example |
| 1-4-23d | 23 | A | B | C | C | C | Comparative Example |
| 1-4-24d | 24 | A | B | C | C | C | Comparative Example |
| 1-4-25d | 25 | A | B | C | C | C | Comparative Example |
| 1-4-26d | 26 | A | B | C | C | C | Comparative Example |
| 1-4-27d | 27 | A | A | B | C | C | Comparative Example |
| 1-4-28d | 28 | A | A | B | C | C | Comparative Example |
| 1-4-29d | 29 | A | A | B | C | C | Comparative Example |
| 1-4-30d | 30 | A | B | C | C | C | Comparative Example |
| 1-4-31d | 31 | A | B | C | C | C | Comparative Example |

TABLE 14

| Test piece No. | Cooling aqueous solution No. | \multicolumn{5}{c|}{Surface temperature of plated steel sheet immediately before cooling in water quenching zone (° C.)} | Remark |
| --- | --- | --- | --- | --- | --- | --- | --- |
| | | 100 | 120 | 160 | 200 | 250 | |
| 1-4-1e | 1 | A | A | B | C | C | Comparative Example |
| 1-4-2e | 2 | A | B | C | C | C | Comparative Example |
| 1-4-3e | 3 | A | A | A | A | A | Example |
| 1-4-4e | 4 | A | A | B | C | C | Comparative Example |
| 1-4-5e | 5 | A | A | B | C | C | Comparative Example |
| 1-4-6e | 6 | A | A | B | C | C | Comparative Example |
| 1-4-7e | 7 | A | A | B | C | C | Comparative Example |
| 1-4-8e | 8 | A | B | C | C | C | Comparative Example |
| 1-4-9e | 9 | A | B | C | C | C | Comparative Example |
| 1-4-10e | 10 | A | B | C | C | C | Comparative Example |
| 1-4-11e | 11 | A | A | A | A | A | Example |
| 1-4-12e | 12 | A | A | A | A | A | Example |
| 1-4-13e | 13 | A | A | A | A | A | Example |

TABLE 14-continued

| Test piece No. | Cooling aqueous solution No. | 100 | 120 | 160 | 200 | 250 | Remark |
|---|---|---|---|---|---|---|---|
| 1-4-14e | 14 | A | A | A | A | A | Example |
| 1-4-15e | 15 | A | A | A | A | A | Example |
| 1-4-16e | 16 | A | A | A | A | A | Example |
| 1-4-17e | 17 | A | A | A | A | A | Example |
| 1-4-18e | 18 | A | A | A | A | A | Example |
| 1-4-19e | 19 | A | B | C | C | C | Comparative Example |
| 1-4-20e | 20 | A | B | C | C | C | Comparative Example |
| 1-4-21e | 21 | A | B | B | C | C | Comparative Example |
| 1-4-22e | 22 | A | B | C | C | C | Comparative Example |
| 1-4-23e | 23 | A | B | C | C | C | Comparative Example |
| 1-4-24e | 24 | A | B | C | C | C | Comparative Example |
| 1-4-25e | 25 | A | B | C | C | C | Comparative Example |
| 1-4-26e | 26 | A | B | C | C | C | Comparative Example |
| 1-4-27e | 27 | A | A | B | C | C | Comparative Example |
| 1-4-28e | 28 | A | A | B | C | C | Comparative Example |
| 1-4-29e | 29 | A | A | B | C | C | Comparative Example |
| 1-4-30e | 30 | A | B | C | C | C | Comparative Example |
| 1-4-31e | 31 | A | B | C | C | C | Comparative Example |

TABLE 15

| Test piece No. | Cooling aqueous solution No. | 100 | 120 | 160 | 200 | 250 | Remark |
|---|---|---|---|---|---|---|---|
| 1-5-1b | 1 | A | A | A | A | A | Comparative Example |
| 1-5-2b | 2 | A | A | A | A | A | Comparative Example |
| 1-5-3b | 3 | A | A | A | A | A | Example |
| 1-5-4b | 4 | A | A | A | A | A | Comparative Example |
| 1-5-5b | 5 | A | A | A | A | A | Comparative Example |
| 1-5-6b | 6 | A | A | A | A | A | Comparative Example |
| 1-5-7b | 7 | A | A | A | A | A | Comparative Example |
| 1-5-8b | 8 | A | A | A | A | A | Comparative Example |
| 1-5-9b | 9 | A | A | A | A | A | Comparative Example |
| 1-5-10b | 10 | A | A | A | A | A | Comparative Example |
| 1-5-11b | 11 | A | A | A | A | A | Example |
| 1-5-12b | 12 | A | A | A | A | A | Example |
| 1-5-13b | 13 | A | A | A | A | A | Example |
| 1-5-14b | 14 | A | A | A | A | A | Example |
| 1-5-15b | 15 | A | A | A | A | A | Example |
| 1-5-16b | 16 | A | A | A | A | A | Example |
| 1-5-17b | 17 | A | A | A | A | A | Example |
| 1-5-18b | 18 | A | A | A | A | A | Example |
| 1-5-19b | 19 | A | A | A | A | A | Comparative Example |
| 1-5-20b | 20 | A | A | A | A | A | Comparative Example |
| 1-5-21b | 21 | A | A | A | A | A | Comparative Example |
| 1-5-22b | 22 | A | A | A | A | A | Comparative Example |
| 1-5-23b | 23 | A | A | A | A | A | Comparative Example |
| 1-5-24b | 24 | A | A | A | A | A | Comparative Example |
| 1-5-25b | 25 | A | A | A | A | A | Comparative Example |
| 1-5-26b | 26 | A | A | A | A | A | Comparative Example |
| 1-5-27b | 27 | A | A | A | A | A | Comparative Example |
| 1-5-28b | 28 | A | A | A | A | A | Comparative Example |
| 1-5-29b | 29 | A | A | A | A | A | Comparative Example |
| 1-5-30b | 30 | A | A | A | A | A | Comparative Example |
| 1-5-31b | 31 | A | A | A | A | A | Comparative Example |

TABLE 16

| Test piece No. | Cooling aqueous solution No. | 100 | 120 | 160 | 200 | 250 | Remark |
|---|---|---|---|---|---|---|---|
| 1-6-1b | 1 | A | A | B | C | C | Comparative Example |
| 1-6-2b | 2 | A | B | C | C | C | Comparative Example |
| 1-6-3b | 3 | A | A | A | A | A | Example |
| 1-6-4b | 4 | A | A | B | C | C | Comparative Example |
| 1-6-5b | 5 | A | A | B | C | C | Comparative Example |
| 1-6-6b | 6 | A | A | B | C | C | Comparative Example |
| 1-6-7b | 7 | A | A | B | C | C | Comparative Example |
| 1-6-8b | 8 | A | B | C | C | C | Comparative Example |
| 1-6-9b | 9 | A | B | C | C | C | Comparative Example |
| 1-6-10b | 10 | A | B | C | C | C | Comparative Example |
| 1-6-11b | 11 | A | A | A | A | A | Example |
| 1-6-12b | 12 | A | A | A | A | A | Example |
| 1-6-13b | 13 | A | A | A | A | A | Example |
| 1-6-14b | 14 | A | A | A | A | A | Example |
| 1-6-15b | 15 | A | A | A | A | A | Example |
| 1-6-16b | 16 | A | A | A | A | A | Example |
| 1-6-17b | 17 | A | A | A | A | A | Example |
| 1-6-18b | 18 | A | A | A | A | A | Example |
| 1-6-19b | 19 | A | B | C | C | C | Comparative Example |
| 1-6-20b | 20 | A | B | C | C | C | Comparative Example |
| 1-6-21b | 21 | A | B | B | C | C | Comparative Example |
| 1-6-22b | 22 | A | B | C | C | C | Comparative Example |
| 1-6-23b | 23 | A | B | C | C | C | Comparative Example |
| 1-6-24b | 24 | A | B | C | C | C | Comparative Example |
| 1-6-25b | 25 | A | B | C | C | C | Comparative Example |
| 1-6-26b | 26 | A | B | C | C | C | Comparative Example |
| 1-6-27b | 27 | A | A | B | C | C | Comparative Example |
| 1-6-28b | 28 | A | A | B | C | C | Comparative Example |
| 1-6-29b | 29 | A | A | B | C | C | Comparative Example |
| 1-6-30b | 30 | A | B | C | C | C | Comparative Example |
| 1-6-31b | 31 | A | B | C | C | C | Comparative Example |

TABLE 17

| Test piece No. | Cooling aqueous solution No. | 100 | 120 | 160 | 200 | 250 | Remark |
|---|---|---|---|---|---|---|---|
| 1-7-1b | 1 | A | A | A | A | A | Comparative Example |
| 1-7-2b | 2 | A | A | A | A | A | Comparative Example |
| 1-7-3b | 3 | A | A | A | A | A | Example |
| 1-7-4b | 4 | A | A | A | A | A | Comparative Example |
| 1-7-5b | 5 | A | A | A | A | A | Comparative Example |
| 1-7-6b | 6 | A | A | A | A | A | Comparative Example |
| 1-7-7b | 7 | A | A | A | A | A | Comparative Example |
| 1-7-8b | 8 | A | A | A | A | A | Comparative Example |
| 1-7-9b | 9 | A | A | A | A | A | Comparative Example |
| 1-7-10b | 10 | A | A | A | A | A | Comparative Example |
| 1-7-11b | 11 | A | A | A | A | A | Example |
| 1-7-12b | 12 | A | A | A | A | A | Example |
| 1-7-13b | 13 | A | A | A | A | A | Example |
| 1-7-14b | 14 | A | A | A | A | A | Example |
| 1-7-15b | 15 | A | A | A | A | A | Example |
| 1-7-16b | 16 | A | A | A | A | A | Example |
| 1-7-17b | 17 | A | A | A | A | A | Example |
| 1-7-18b | 18 | A | A | A | A | A | Example |
| 1-7-19b | 19 | A | A | A | A | A | Comparative Example |
| 1-7-20b | 20 | A | A | A | A | A | Comparative Example |
| 1-7-21b | 21 | A | A | A | A | A | Comparative Example |
| 1-7-22b | 22 | A | A | A | A | A | Comparative Example |
| 1-7-23b | 23 | A | A | A | A | A | Comparative Example |
| 1-7-24b | 24 | A | A | A | A | A | Comparative Example |
| 1-7-25b | 25 | A | A | A | A | A | Comparative Example |
| 1-7-26b | 26 | A | A | A | A | A | Comparative Example |
| 1-7-27b | 27 | A | A | A | A | A | Comparative Example |
| 1-7-28b | 28 | A | A | A | A | A | Comparative Example |

TABLE 17-continued

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 1-7-29b | 29 | A | A | A | A | A | Comparative Example |
| 1-7-30b | 30 | A | A | A | A | A | Comparative Example |
| 1-7-31b | 31 | A | A | A | A | A | Comparative Example |

TABLE 18

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 1-8-1b | 1 | A | A | B | C | C | Comparative Example |
| 1-8-2b | 2 | A | B | C | C | C | Comparative Example |
| 1-8-3b | 3 | A | A | A | A | A | Example |
| 1-8-4b | 4 | A | A | B | C | C | Comparative Example |
| 1-8-5b | 5 | A | A | B | C | C | Comparative Example |
| 1-8-6b | 6 | A | A | B | C | C | Comparative Example |
| 1-8-7b | 7 | A | A | B | C | C | Comparative Example |
| 1-8-8b | 8 | A | B | C | C | C | Comparative Example |
| 1-8-9b | 9 | A | B | C | C | C | Comparative Example |
| 1-8-10b | 10 | A | B | C | C | C | Comparative Example |
| 1-8-11b | 11 | A | A | A | A | A | Example |
| 1-8-12b | 12 | A | A | A | A | A | Example |
| 1-8-13b | 13 | A | A | A | A | A | Example |
| 1-8-14b | 14 | A | A | A | A | A | Example |
| 1-8-15b | 15 | A | A | A | A | A | Example |
| 1-8-16b | 16 | A | A | A | A | A | Example |
| 1-8-17b | 17 | A | A | A | A | A | Example |
| 1-8-18b | 18 | A | A | A | A | A | Example |
| 1-8-19b | 19 | A | B | C | C | C | Comparative Example |
| 1-8-20b | 20 | A | B | C | C | C | Comparative Example |
| 1-8-21b | 21 | A | B | B | C | C | Comparative Example |
| 1-8-22b | 22 | A | B | C | C | C | Comparative Example |
| 1-8-23b | 23 | A | B | C | C | C | Comparative Example |
| 1-8-24b | 24 | A | B | C | C | C | Comparative Example |
| 1-8-25b | 25 | A | B | C | C | C | Comparative Example |
| 1-8-26b | 26 | A | B | C | C | C | Comparative Example |
| 1-8-27b | 27 | A | A | B | C | C | Comparative Example |
| 1-8-28b | 28 | A | A | B | C | C | Comparative Example |
| 1-8-29b | 29 | A | A | B | C | C | Comparative Example |
| 1-8-30b | 30 | A | B | C | C | C | Comparative Example |
| 1-8-31b | 31 | A | B | C | C | C | Comparative Example |

As shown in Tables 7, 8, 11 to 14, 16 and 18, test pieces having plating layers containing Al and Mg within predetermined concentration ranges and not containing Si had good blackening resistance independently of the temperature of the steel sheet immediately before cooling in water quenching zone 360 as long as an aqueous solution containing a polyatomic ion including $V^{5+}$, $Si^{4+}$, or $Cr^{6+}$ in a concentration, in terms of atom, of 0.01 g/L or more was used for the cooling.

As shown in Table 10, even when a test piece had a plating layer containing Al and Mg within predetermined concentration ranges and not containing Si and an aqueous solution containing a polyatomic ion including $V^{5+}$, $Si^{4+}$, or $Cr^{6+}$ was used, the blackening could not be sufficiently suppressed when the concentration, in terms of atom, of the polyatomic ion was 0.001 g/L.

As shown in Tables 9, 15, and 17, test pieces having plating layers containing Al and Mg within predetermined concentration ranges and containing Si had good blackening resistance independently of the presence of an additive and the temperature of the steel sheet immediately before cooling in water quenching zone 360.

It is understood, from these results, that the blackening can be sufficiently suppressed independently of the temperature of a steel sheet immediately before cooling in water quenching zone 360 when an aqueous solution containing a polyatomic ion including $V^{5+}$, $Si^{4+}$, or $Cr^{6+}$ in a concentration, in terms of atom, of 0.01 g/L or more is used for the cooling.

As shown in Tables 10 to 14, test pieces cooled by using an aqueous solution containing a polyatomic ion including $Mn^{2+}$, $Ca^{2+}$, $Mg^{2+}$, or $Zn^{2+}$ had rather good blackening resistance when the concentration of the polyatomic ion in terms of atom is 0.01 g/L or more.

Experiment 3

In Experiment 3, blackening resistance was examined for the hot-dip Zn alloy-plated steel sheets produced in Experiment 2 subjected to the brightness degradation accelerating process under the conditions No. 2 of Table 2, and evaluated in the same manner as in Experiment 1.

A correspondence between the plating No. of each of the evaluated hot-dip Zn alloy-plated steel sheets and the concentration of an additive in the used cooling aqueous solution is shown in Table 19. The results are shown in tables listed in Table 19.

TABLE 19

| | Concentration of polyatomic ion (in terms of atom; g/L) | | | | |
|---|---|---|---|---|---|
| Plating No. | 0.001 | 0.01 | 0.1 | 1.0 | 10 |
| 1 | — | Table 20 | — | — | — |
| 2 | — | Table 21 | — | — | — |
| 3 | — | Table 22 | — | — | — |

TABLE 19-continued

| | Concentration of polyatomic ion (in terms of atom; g/L) | | | | |
|---|---|---|---|---|---|
| Plating No. | 0.001 | 0.01 | 0.1 | 1.0 | 10 |
| 4 | Table 23 | Table 24 | Table 25 | Table 26 | Table 27 |
| 5 | — | Table 28 | — | — | — |
| 6 | — | Table 29 | — | — | — |
| 7 | Table 30 | Table 31 | — | — | — |
| 8 | — | Table 32 | — | — | — |

With respect to each of the plated steel sheets, the relationships among the cooling aqueous solution used, the temperature of the steel sheet (plating layer surface) immediately before cooling in water quenching zone 360 and an evaluation result of the blackening degree are shown in Tables 20 to 32.

TABLE 20

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-1-1b | 1 | C | C | C | C | C | Comparative Example |
| 2-1-2b | 2 | C | C | C | C | C | Comparative Example |
| 2-1-3b | 3 | A | A | A | A | A | Example |
| 2-1-4b | 4 | C | C | C | C | C | Comparative Example |
| 2-1-5b | 5 | C | C | C | C | C | Comparative Example |
| 2-1-6b | 6 | C | C | C | C | C | Comparative Example |
| 2-1-7b | 7 | C | C | C | C | C | Comparative Example |
| 2-1-8b | 8 | C | C | C | C | C | Comparative Example |
| 2-1-9b | 9 | C | C | C | C | C | Comparative Example |
| 2-1-10b | 10 | C | C | C | C | C | Comparative Example |
| 2-1-11b | 11 | A | A | A | A | A | Example |
| 2-1-12b | 12 | A | A | A | A | A | Example |
| 2-1-13b | 13 | A | A | A | A | A | Example |
| 2-1-14b | 14 | A | A | A | A | A | Example |
| 2-1-15b | 15 | A | A | A | A | A | Example |
| 2-1-16b | 16 | A | A | A | A | A | Example |
| 2-1-17b | 17 | A | A | A | A | A | Example |
| 2-1-18b | 18 | A | A | A | A | A | Example |
| 2-1-19b | 19 | C | C | C | C | C | Comparative Example |
| 2-1-20b | 20 | C | C | C | C | C | Comparative Example |
| 2-1-21b | 21 | C | C | C | C | C | Comparative Example |
| 2-1-22b | 22 | C | C | C | C | C | Comparative Example |
| 2-1-23b | 23 | C | C | C | C | C | Comparative Example |
| 2-1-24b | 24 | C | C | C | C | C | Comparative Example |
| 2-1-25b | 25 | C | C | C | C | C | Comparative Example |
| 2-1-26b | 26 | C | C | C | C | C | Comparative Example |
| 2-1-27b | 27 | C | C | C | C | C | Comparative Example |
| 2-1-28b | 28 | C | C | C | C | C | Comparative Example |
| 2-1-29b | 29 | C | C | C | C | C | Comparative Example |
| 2-1-30b | 30 | C | C | C | C | C | Comparative Example |
| 2-1-31b | 31 | C | C | C | C | C | Comparative Example |

TABLE 21

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-2-1b | 1 | C | C | C | C | C | Comparative Example |
| 2-2-2b | 2 | C | C | C | C | C | Comparative Example |
| 2-2-3b | 3 | A | A | A | A | A | Example |
| 2-2-4b | 4 | C | C | C | C | C | Comparative Example |
| 2-2-5b | 5 | C | C | C | C | C | Comparative Example |
| 2-2-6b | 6 | C | C | C | C | C | Comparative Example |
| 2-2-7b | 7 | C | C | C | C | C | Comparative Example |
| 2-2-8b | 8 | C | C | C | C | C | Comparative Example |

TABLE 21-continued

| Test piece No. | Cooling aqueous solution No. | 100 | 120 | 160 | 200 | 250 | Remark |
|---|---|---|---|---|---|---|---|
| 2-2-9b | 9 | C | C | C | C | C | Comparative Example |
| 2-2-10b | 10 | C | C | C | C | C | Comparative Example |
| 2-2-11b | 11 | A | A | A | A | A | Example |
| 2-2-12b | 12 | A | A | A | A | A | Example |
| 2-2-13b | 13 | A | A | A | A | A | Example |
| 2-2-14b | 14 | A | A | A | A | A | Example |
| 2-2-15b | 15 | A | A | A | A | A | Example |
| 2-2-16b | 16 | A | A | A | A | A | Example |
| 2-2-17b | 17 | A | A | A | A | A | Example |
| 2-2-18b | 18 | A | A | A | A | A | Example |
| 2-2-19b | 19 | C | C | C | C | C | Comparative Example |
| 2-2-20b | 20 | C | C | C | C | C | Comparative Example |
| 2-2-21b | 21 | C | C | C | C | C | Comparative Example |
| 2-2-22b | 22 | C | C | C | C | C | Comparative Example |
| 2-2-23b | 23 | C | C | C | C | C | Comparative Example |
| 2-2-24b | 24 | C | C | C | C | C | Comparative Example |
| 2-2-25b | 25 | C | C | C | C | C | Comparative Example |
| 2-2-26b | 26 | C | C | C | C | C | Comparative Example |
| 2-2-27b | 27 | C | C | C | C | C | Comparative Example |
| 2-2-28b | 28 | C | C | C | C | C | Comparative Example |
| 2-2-29b | 29 | C | C | C | C | C | Comparative Example |
| 2-2-30b | 30 | C | C | C | C | C | Comparative Example |
| 2-2-31b | 31 | C | C | C | C | C | Comparative Example |

TABLE 22

| Test piece No. | Cooling aqueous solution No. | 100 | 120 | 160 | 200 | 250 | Remark |
|---|---|---|---|---|---|---|---|
| 2-3-1b | 1 | A | A | A | B | C | Comparative Example |
| 2-3-2b | 2 | A | A | B | C | C | Comparative Example |
| 2-3-3b | 3 | A | A | A | A | A | Example |
| 2-3-4b | 4 | A | A | A | B | C | Comparative Example |
| 2-3-5b | 5 | A | A | A | B | C | Comparative Example |
| 2-3-6b | 6 | A | A | A | B | C | Comparative Example |
| 2-3-7b | 7 | A | A | A | B | C | Comparative Example |
| 2-3-8b | 8 | A | A | B | C | C | Comparative Example |
| 2-3-9b | 9 | A | A | B | C | C | Comparative Example |
| 2-3-10b | 10 | A | A | B | C | C | Comparative Example |
| 2-3-11b | 11 | A | A | A | A | A | Example |
| 2-3-12b | 12 | A | A | A | A | A | Example |
| 2-3-13b | 13 | A | A | A | A | A | Example |
| 2-3-14b | 14 | A | A | A | A | A | Example |
| 2-3-15b | 15 | A | A | A | A | A | Example |
| 2-3-16b | 16 | A | A | A | A | A | Example |
| 2-3-17b | 17 | A | A | A | A | A | Example |
| 2-3-18b | 18 | A | A | A | A | A | Example |
| 2-3-19b | 19 | A | A | B | C | C | Comparative Example |
| 2-3-20b | 20 | A | A | B | C | C | Comparative Example |
| 2-3-21b | 21 | A | A | B | B | C | Comparative Example |
| 2-3-22b | 22 | A | A | B | C | C | Comparative Example |
| 2-3-23b | 23 | A | A | B | C | C | Comparative Example |
| 2-3-24b | 24 | A | A | B | C | C | Comparative Example |
| 2-3-25b | 25 | A | A | B | C | C | Comparative Example |
| 2-3-26b | 26 | A | A | B | C | C | Comparative Example |
| 2-3-27b | 27 | A | A | A | B | C | Comparative Example |
| 2-3-28b | 28 | A | A | A | B | C | Comparative Example |
| 2-3-29b | 29 | A | A | A | B | C | Comparative Example |
| 2-3-30b | 30 | A | A | B | C | C | Comparative Example |
| 2-3-31b | 31 | A | A | B | C | C | Comparative Example |

Surface temperature of plated steel sheet immediately before cooling in water quenching zone (° C.)

TABLE 23

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-4-1a | 1 | C | C | C | C | C | Comparative Example |
| 2-4-2a | 2 | C | C | C | C | C | Comparative Example |
| 2-4-3a | 3 | C | C | C | C | C | Comparative Example |
| 2-4-4a | 4 | C | C | C | C | C | Comparative Example |
| 2-4-5a | 5 | C | C | C | C | C | Comparative Example |
| 2-4-6a | 6 | C | C | C | C | C | Comparative Example |
| 2-4-7a | 7 | C | C | C | C | C | Comparative Example |
| 2-4-8a | 8 | C | C | C | C | C | Comparative Example |
| 2-4-9a | 9 | C | C | C | C | C | Comparative Example |
| 2-4-10a | 10 | C | C | C | C | C | Comparative Example |
| 2-4-11a | 11 | C | C | C | C | C | Comparative Example |
| 2-4-12a | 12 | C | C | C | C | C | Comparative Example |
| 2-4-13a | 13 | C | C | C | C | C | Comparative Example |
| 2-4-14a | 14 | C | C | C | C | C | Comparative Example |
| 2-4-15a | 15 | C | C | C | C | C | Comparative Example |
| 2-4-16a | 16 | C | C | C | C | C | Comparative Example |
| 2-4-17a | 17 | C | C | C | C | C | Comparative Example |
| 2-4-18a | 18 | C | C | C | C | C | Comparative Example |
| 2-4-19a | 19 | C | C | C | C | C | Comparative Example |
| 2-4-20a | 20 | C | C | C | C | C | Comparative Example |
| 2-4-21a | 21 | C | C | C | C | C | Comparative Example |
| 2-4-22a | 22 | C | C | C | C | C | Comparative Example |
| 2-4-23a | 23 | C | C | C | C | C | Comparative Example |
| 2-4-24a | 24 | C | C | C | C | C | Comparative Example |
| 2-4-25a | 25 | C | C | C | C | C | Comparative Example |
| 2-4-26a | 26 | C | C | C | C | C | Comparative Example |
| 2-4-27a | 27 | C | C | C | C | C | Comparative Example |
| 2-4-28a | 28 | C | C | C | C | C | Comparative Example |
| 2-4-29a | 29 | C | C | C | C | C | Comparative Example |
| 2-4-30a | 30 | C | C | C | C | C | Comparative Example |
| 2-4-31a | 31 | C | C | C | C | C | Comparative Example |

TABLE 24

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-4-1b | 1 | C | C | C | C | C | Comparative Example |
| 2-4-2b | 2 | C | C | C | C | C | Comparative Example |
| 2-4-3b | 3 | A | A | A | A | A | Example |
| 2-4-4b | 4 | C | C | C | C | C | Comparative Example |
| 2-4-5b | 5 | C | C | C | C | C | Comparative Example |
| 2-4-6b | 6 | C | C | C | C | C | Comparative Example |
| 2-4-7b | 7 | C | C | C | C | C | Comparative Example |
| 2-4-8b | 8 | C | C | C | C | C | Comparative Example |
| 2-4-9b | 9 | C | C | C | C | C | Comparative Example |
| 2-4-10b | 10 | C | C | C | C | C | Comparative Example |
| 2-4-11b | 11 | A | A | A | A | A | Example |
| 2-4-12b | 12 | A | A | A | A | A | Example |
| 2-4-13b | 13 | A | A | A | A | A | Example |
| 2-4-14b | 14 | A | A | A | A | A | Example |
| 2-4-15b | 15 | A | A | A | A | A | Example |
| 2-4-16b | 16 | A | A | A | A | A | Example |
| 2-4-17b | 17 | A | A | A | A | A | Example |
| 2-4-18b | 18 | A | A | A | A | A | Example |
| 2-4-19b | 19 | C | C | C | C | C | Comparative Example |
| 2-4-20b | 20 | C | C | C | C | C | Comparative Example |
| 2-4-21b | 21 | C | C | C | C | C | Comparative Example |
| 2-4-22b | 22 | C | C | C | C | C | Comparative Example |
| 2-4-23b | 23 | C | C | C | C | C | Comparative Example |
| 2-4-24b | 24 | C | C | C | C | C | Comparative Example |
| 2-4-25b | 25 | C | C | C | C | C | Comparative Example |
| 2-4-26b | 26 | C | C | C | C | C | Comparative Example |
| 2-4-27b | 27 | C | C | C | C | C | Comparative Example |
| 2-4-28b | 28 | C | C | C | C | C | Comparative Example |
| 2-4-29b | 29 | C | C | C | C | C | Comparative Example |

TABLE 24-continued

| Test piece No. | Cooling aqueous solution No. | \multicolumn{5}{c}{Surface temperature of plated steel sheet immediately before cooling in water quenching zone (° C.)} | Remark |
| --- | --- | --- | --- | --- | --- | --- | --- |
| | | 100 | 120 | 160 | 200 | 250 | |
| 2-4-30b | 30 | C | C | C | C | C | Comparative Example |
| 2-4-31b | 31 | C | C | C | C | C | Comparative Example |

TABLE 25

| Test piece No. | Cooling aqueous solution No. | \multicolumn{5}{c}{Surface temperature of plated steel sheet immediately before cooling in water quenching zone (° C.)} | Remark |
| --- | --- | --- | --- | --- | --- | --- | --- |
| | | 100 | 120 | 160 | 200 | 250 | |
| 2-4-1c | 1 | C | C | C | C | C | Comparative Example |
| 2-4-2c | 2 | C | C | C | C | C | Comparative Example |
| 2-4-3c | 3 | A | A | A | A | A | Example |
| 2-4-4c | 4 | C | C | C | C | C | Comparative Example |
| 2-4-5c | 5 | C | C | C | C | C | Comparative Example |
| 2-4-6c | 6 | C | C | C | C | C | Comparative Example |
| 2-4-7c | 7 | C | C | C | C | C | Comparative Example |
| 2-4-8c | 8 | C | C | C | C | C | Comparative Example |
| 2-4-9c | 9 | C | C | C | C | C | Comparative Example |
| 2-4-10c | 10 | C | C | C | C | C | Comparative Example |
| 2-4-11c | 11 | A | A | A | A | A | Example |
| 2-4-12c | 12 | A | A | A | A | A | Example |
| 2-4-13c | 13 | A | A | A | A | A | Example |
| 2-4-14c | 14 | A | A | A | A | A | Example |
| 2-4-15c | 15 | A | A | A | A | A | Example |
| 2-4-16c | 16 | A | A | A | A | A | Example |
| 2-4-17c | 17 | A | A | A | A | A | Example |
| 2-4-18c | 18 | A | A | A | A | A | Example |
| 2-4-19c | 19 | C | C | C | C | C | Comparative Example |
| 2-4-20c | 20 | C | C | C | C | C | Comparative Example |
| 2-4-21c | 21 | C | C | C | C | C | Comparative Example |
| 2-4-22c | 22 | C | C | C | C | C | Comparative Example |
| 2-4-23c | 23 | C | C | C | C | C | Comparative Example |
| 2-4-24c | 24 | C | C | C | C | C | Comparative Example |
| 2-4-25c | 25 | C | C | C | C | C | Comparative Example |
| 2-4-26c | 26 | C | C | C | C | C | Comparative Example |
| 2-4-27c | 27 | C | C | C | C | C | Comparative Example |
| 2-4-28c | 28 | C | C | C | C | C | Comparative Example |
| 2-4-29c | 29 | C | C | C | C | C | Comparative Example |
| 2-4-30c | 30 | C | C | C | C | C | Comparative Example |
| 2-4-31c | 31 | C | C | C | C | C | Comparative Example |

TABLE 26

| Test piece No. | Cooling aqueous solution No. | \multicolumn{5}{c}{Surface temperature of plated steel sheet immediately before cooling in water quenching zone (° C.)} | Remark |
| --- | --- | --- | --- | --- | --- | --- | --- |
| | | 100 | 120 | 160 | 200 | 250 | |
| 2-4-1d | 1 | C | C | C | C | C | Comparative Example |
| 2-4-2d | 2 | C | C | C | C | C | Comparative Example |
| 2-4-3d | 3 | A | A | A | A | A | Example |
| 2-4-4d | 4 | C | C | C | C | C | Comparative Example |
| 2-4-5d | 5 | C | C | C | C | C | Comparative Example |
| 2-4-6d | 6 | C | C | C | C | C | Comparative Example |
| 2-4-7d | 7 | C | C | C | C | C | Comparative Example |
| 2-4-8d | 8 | C | C | C | C | C | Comparative Example |
| 2-4-9d | 9 | C | C | C | C | C | Comparative Example |
| 2-4-10d | 10 | C | C | C | C | C | Comparative Example |
| 2-4-11d | 11 | A | A | A | A | A | Example |
| 2-4-12d | 12 | A | A | A | A | A | Example |
| 2-4-13d | 13 | A | A | A | A | A | Example |
| 2-4-14d | 14 | A | A | A | A | A | Example |

TABLE 26-continued

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-4-15d | 15 | A | A | A | A | A | Example |
| 2-4-16d | 16 | A | A | A | A | A | Example |
| 2-4-17d | 17 | A | A | A | A | A | Example |
| 2-4-18d | 18 | A | A | A | A | A | Example |
| 2-4-19d | 19 | C | C | C | C | C | Comparative Example |
| 2-4-20d | 20 | C | C | C | C | C | Comparative Example |
| 2-4-21d | 21 | C | C | C | C | C | Comparative Example |
| 2-4-22d | 22 | C | C | C | C | C | Comparative Example |
| 2-4-23d | 23 | C | C | C | C | C | Comparative Example |
| 2-4-24d | 24 | C | C | C | C | C | Comparative Example |
| 2-4-25d | 25 | C | C | C | C | C | Comparative Example |
| 2-4-26d | 26 | C | C | C | C | C | Comparative Example |
| 2-4-27d | 27 | C | C | C | C | C | Comparative Example |
| 2-4-28d | 28 | C | C | C | C | C | Comparative Example |
| 2-4-29d | 29 | C | C | C | C | C | Comparative Example |
| 2-4-30d | 30 | C | C | C | C | C | Comparative Example |
| 2-4-31d | 31 | C | C | C | C | C | Comparative Example |

TABLE 27

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-4-1e | 1 | C | C | C | C | C | Comparative Example |
| 2-4-2e | 2 | C | C | C | C | C | Comparative Example |
| 2-4-3e | 3 | A | A | A | A | A | Example |
| 2-4-4e | 4 | C | C | C | C | C | Comparative Example |
| 2-4-5e | 5 | C | C | C | C | C | Comparative Example |
| 2-4-6e | 6 | C | C | C | C | C | Comparative Example |
| 2-4-7e | 7 | C | C | C | C | C | Comparative Example |
| 2-4-8e | 8 | C | C | C | C | C | Comparative Example |
| 2-4-9e | 9 | C | C | C | C | C | Comparative Example |
| 2-4-10e | 10 | C | C | C | C | C | Comparative Example |
| 2-4-11e | 11 | A | A | A | A | A | Example |
| 2-4-12e | 12 | A | A | A | A | A | Example |
| 2-4-13e | 13 | A | A | A | A | A | Example |
| 2-4-14e | 14 | A | A | A | A | A | Example |
| 2-4-15e | 15 | A | A | A | A | A | Example |
| 2-4-16e | 16 | A | A | A | A | A | Example |
| 2-4-17e | 17 | A | A | A | A | A | Example |
| 2-4-18e | 18 | A | A | A | A | A | Example |
| 2-4-19e | 19 | C | C | C | C | C | Comparative Example |
| 2-4-20e | 20 | C | C | C | C | C | Comparative Example |
| 2-4-21e | 21 | C | C | C | C | C | Comparative Example |
| 2-4-22e | 22 | C | C | C | C | C | Comparative Example |
| 2-4-23e | 23 | C | C | C | C | C | Comparative Example |
| 2-4-24e | 24 | C | C | C | C | C | Comparative Example |
| 2-4-25e | 25 | C | C | C | C | C | Comparative Example |
| 2-4-26e | 26 | C | C | C | C | C | Comparative Example |
| 2-4-27e | 27 | C | C | C | C | C | Comparative Example |
| 2-4-28e | 28 | C | C | C | C | C | Comparative Example |
| 2-4-29e | 29 | C | C | C | C | C | Comparative Example |
| 2-4-30e | 30 | C | C | C | C | C | Comparative Example |
| 2-4-31e | 31 | C | C | C | C | C | Comparative Example |

TABLE 28

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-5-1b | 1 | A | A | B | C | C | Comparative Example |
| 2-5-2b | 2 | A | B | C | C | C | Comparative Example |
| 2-5-3b | 3 | A | A | A | A | A | Example |
| 2-5-4b | 4 | A | A | B | C | C | Comparative Example |
| 2-5-5b | 5 | A | A | B | C | C | Comparative Example |
| 2-5-6b | 6 | A | A | B | C | C | Comparative Example |
| 2-5-7b | 7 | A | A | B | C | C | Comparative Example |
| 2-5-8b | 8 | A | B | C | C | C | Comparative Example |
| 2-5-9b | 9 | A | B | C | C | C | Comparative Example |
| 2-5-10b | 10 | A | B | C | C | C | Comparative Example |
| 2-5-11b | 11 | A | A | A | A | A | Example |
| 2-5-12b | 12 | A | A | A | A | A | Example |
| 2-5-13b | 13 | A | A | A | A | A | Example |
| 2-5-14b | 14 | A | A | A | A | A | Example |
| 2-5-15b | 15 | A | A | A | A | A | Example |
| 2-5-16b | 16 | A | A | A | A | A | Example |
| 2-5-17b | 17 | A | A | A | A | A | Example |
| 2-5-18b | 18 | A | A | A | A | A | Example |
| 2-5-19b | 19 | A | B | C | C | C | Comparative Example |
| 2-5-20b | 20 | A | B | C | C | C | Comparative Example |
| 2-5-21b | 21 | A | B | B | C | C | Comparative Example |
| 2-5-22b | 22 | A | B | C | C | C | Comparative Example |
| 2-5-23b | 23 | A | B | C | C | C | Comparative Example |
| 2-5-24b | 24 | A | B | C | C | C | Comparative Example |
| 2-5-25b | 25 | A | B | C | C | C | Comparative Example |
| 2-5-26b | 26 | A | B | C | C | C | Comparative Example |
| 2-5-27b | 27 | A | A | B | C | C | Comparative Example |
| 2-5-28b | 28 | A | A | B | C | C | Comparative Example |
| 2-5-29b | 29 | A | A | B | C | C | Comparative Example |
| 2-5-30b | 30 | A | B | C | C | C | Comparative Example |
| 2-5-31b | 31 | A | B | C | C | C | Comparative Example |

TABLE 29

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-6-1b | 1 | C | C | C | C | C | Comparative Example |
| 2-6-2b | 2 | C | C | C | C | C | Comparative Example |
| 2-6-3b | 3 | A | A | A | A | A | Example |
| 2-6-4b | 4 | C | C | C | C | C | Comparative Example |
| 2-6-5b | 5 | C | C | C | C | C | Comparative Example |
| 2-6-6b | 6 | C | C | C | C | C | Comparative Example |
| 2-6-7b | 7 | C | C | C | C | C | Comparative Example |
| 2-6-8b | 8 | C | C | C | C | C | Comparative Example |
| 2-6-9b | 9 | C | C | C | C | C | Comparative Example |
| 2-6-10b | 10 | C | C | C | C | C | Comparative Example |
| 2-6-11b | 11 | A | A | A | A | A | Example |
| 2-6-12b | 12 | A | A | A | A | A | Example |
| 2-6-13b | 13 | A | A | A | A | A | Example |
| 2-6-14b | 14 | A | A | A | A | A | Example |
| 2-6-15b | 15 | A | A | A | A | A | Example |
| 2-6-16b | 16 | A | A | A | A | A | Example |
| 2-6-17b | 17 | A | A | A | A | A | Example |
| 2-6-18b | 18 | A | A | A | A | A | Example |
| 2-6-19b | 19 | C | C | C | C | C | Comparative Example |
| 2-6-20b | 20 | C | C | C | C | C | Comparative Example |
| 2-6-21b | 21 | C | C | C | C | C | Comparative Example |
| 2-6-22b | 22 | C | C | C | C | C | Comparative Example |
| 2-6-23b | 23 | C | C | C | C | C | Comparative Example |
| 2-6-24b | 24 | C | C | C | C | C | Comparative Example |
| 2-6-25b | 25 | C | C | C | C | C | Comparative Example |
| 2-6-26b | 26 | C | C | C | C | C | Comparative Example |
| 2-6-27b | 27 | C | C | C | C | C | Comparative Example |
| 2-6-28b | 28 | C | C | C | C | C | Comparative Example |
| 2-6-29b | 29 | C | C | C | C | C | Comparative Example |

TABLE 29-continued

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-6-30b | 30 | C | C | C | C | C | Comparative Example |
| 2-6-31b | 31 | C | C | C | C | C | Comparative Example |

TABLE 30

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-7-1a | 1 | A | A | B | C | C | Comparative Example |
| 2-7-2a | 2 | A | A | B | C | C | Comparative Example |
| 2-7-3a | 3 | A | A | B | C | C | Comparative Example |
| 2-7-4a | 4 | A | A | B | C | C | Comparative Example |
| 2-7-5a | 5 | A | A | B | C | C | Comparative Example |
| 2-7-6a | 6 | A | A | B | C | C | Comparative Example |
| 2-7-7a | 7 | A | A | B | C | C | Comparative Example |
| 2-7-8a | 8 | A | A | B | C | C | Comparative Example |
| 2-7-9a | 9 | A | A | B | C | C | Comparative Example |
| 2-7-10a | 10 | A | A | B | C | C | Comparative Example |
| 2-7-11a | 11 | A | A | B | C | C | Comparative Example |
| 2-7-12a | 12 | A | A | B | C | C | Comparative Example |
| 2-7-13a | 13 | A | A | B | C | C | Comparative Example |
| 2-7-14a | 14 | A | A | B | C | C | Comparative Example |
| 2-7-15a | 15 | A | A | B | C | C | Comparative Example |
| 2-7-16a | 16 | A | A | B | C | C | Comparative Example |
| 2-7-17a | 17 | A | A | B | C | C | Comparative Example |
| 2-7-18a | 18 | A | A | B | C | C | Comparative Example |
| 2-7-19a | 19 | A | A | B | C | C | Comparative Example |
| 2-7-20a | 20 | A | A | B | C | C | Comparative Example |
| 2-7-21a | 21 | A | A | B | C | C | Comparative Example |
| 2-7-22a | 22 | A | A | B | C | C | Comparative Example |
| 2-7-23a | 23 | A | A | B | C | C | Comparative Example |
| 2-7-24a | 24 | A | A | B | C | C | Comparative Example |
| 2-7-25a | 25 | A | A | B | C | C | Comparative Example |
| 2-7-26a | 26 | A | A | B | C | C | Comparative Example |
| 2-7-27a | 27 | A | A | B | C | C | Comparative Example |
| 2-7-28a | 28 | A | A | B | C | C | Comparative Example |
| 2-7-29a | 29 | A | A | B | C | C | Comparative Example |
| 2-7-30a | 30 | A | A | B | C | C | Comparative Example |
| 2-7-31a | 31 | A | A | B | C | C | Comparative Example |

TABLE 31

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-7-1b | 1 | A | A | A | B | C | Comparative Example |
| 2-7-2b | 2 | A | A | B | C | C | Comparative Example |
| 2-7-3b | 3 | A | A | A | A | A | Example |
| 2-7-4b | 4 | A | A | A | B | C | Comparative Example |
| 2-7-5b | 5 | A | A | A | B | C | Comparative Example |
| 2-7-6b | 6 | A | A | A | B | C | Comparative Example |
| 2-7-7b | 7 | A | A | A | B | C | Comparative Example |
| 2-7-8b | 8 | A | A | B | C | C | Comparative Example |
| 2-7-9b | 9 | A | A | B | C | C | Comparative Example |
| 2-7-10b | 10 | A | A | B | C | C | Comparative Example |
| 2-7-11b | 11 | A | A | A | A | A | Example |
| 2-7-12b | 12 | A | A | A | A | A | Example |
| 2-7-13b | 13 | A | A | A | A | A | Example |
| 2-7-14b | 14 | A | A | A | A | A | Example |

TABLE 31-continued

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-7-15b | 15 | A | A | A | A | A | Example |
| 2-7-16b | 16 | A | A | A | A | A | Example |
| 2-7-17b | 17 | A | A | A | A | A | Example |
| 2-7-18b | 18 | A | A | A | A | A | Example |
| 2-7-19b | 19 | A | A | B | C | C | Comparative Example |
| 2-7-20b | 20 | A | A | B | C | C | Comparative Example |
| 2-7-21b | 21 | A | A | B | B | C | Comparative Example |
| 2-7-22b | 22 | A | A | B | C | C | Comparative Example |
| 2-7-23b | 23 | A | A | B | C | C | Comparative Example |
| 2-7-24b | 24 | A | A | B | C | C | Comparative Example |
| 2-7-25b | 25 | A | A | B | C | C | Comparative Example |
| 2-7-26b | 26 | A | A | B | C | C | Comparative Example |
| 2-7-27b | 27 | A | A | A | B | C | Comparative Example |
| 2-7-28b | 28 | A | A | A | B | C | Comparative Example |
| 2-7-29b | 29 | A | A | A | B | C | Comparative Example |
| 2-7-30b | 30 | A | A | B | C | C | Comparative Example |
| 2-7-31b | 31 | A | A | B | C | C | Comparative Example |

TABLE 32

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-8-1b | 1 | C | C | C | C | C | Comparative Example |
| 2-8-2b | 2 | C | C | C | C | C | Comparative Example |
| 2-8-3b | 3 | A | A | A | A | A | Example |
| 2-8-4b | 4 | C | C | C | C | C | Comparative Example |
| 2-8-5b | 5 | C | C | C | C | C | Comparative Example |
| 2-8-6b | 6 | C | C | C | C | C | Comparative Example |
| 2-8-7b | 7 | C | C | C | C | C | Comparative Example |
| 2-8-8b | 8 | C | C | C | C | C | Comparative Example |
| 2-8-9b | 9 | C | C | C | C | C | Comparative Example |
| 2-8-10b | 10 | C | C | C | C | C | Comparative Example |
| 2-8-11b | 11 | A | A | A | A | A | Example |
| 2-8-12b | 12 | A | A | A | A | A | Example |
| 2-8-13b | 13 | A | A | A | A | A | Example |
| 2-8-14b | 14 | A | A | A | A | A | Example |
| 2-8-15b | 15 | A | A | A | A | A | Example |
| 2-8-16b | 16 | A | A | A | A | A | Example |
| 2-8-17b | 17 | A | A | A | A | A | Example |
| 2-8-18b | 18 | A | A | A | A | A | Example |
| 2-8-19b | 19 | C | C | C | C | C | Comparative Example |
| 2-8-20b | 20 | C | C | C | C | C | Comparative Example |
| 2-8-21b | 21 | C | C | C | C | C | Comparative Example |
| 2-8-22b | 22 | C | C | C | C | C | Comparative Example |
| 2-8-23b | 23 | C | C | C | C | C | Comparative Example |
| 2-8-24b | 24 | C | C | C | C | C | Comparative Example |
| 2-8-25b | 25 | C | C | C | C | C | Comparative Example |
| 2-8-26b | 26 | C | C | C | C | C | Comparative Example |
| 2-8-27b | 27 | C | C | C | C | C | Comparative Example |
| 2-8-28b | 28 | C | C | C | C | C | Comparative Example |
| 2-8-29b | 29 | C | C | C | C | C | Comparative Example |
| 2-8-30b | 30 | C | C | C | C | C | Comparative Example |
| 2-8-31b | 31 | C | C | C | C | C | Comparative Example |

As shown in Tables 20, 21, 24 to 27, 29 and 32, test pieces having plating layers containing Al and Mg within predetermined concentration ranges and not containing Si had good blackening resistance independently of the temperature of the steel sheet immediately before cooling in water quenching zone 360 when an aqueous solution containing a polyatomic ion including $V^{5+}$, $Si^{4+}$, or $Cr^{6+}$ in a concentration, in terms of atom, of 0.01 g/L or more was used for the cooling.

On the other hand, as shown in Table 23, even in a test piece having a plating layer containing Al and Mg within predetermined concentration ranges and not containing Si, even when a cooling aqueous solution containing a polyatomic ion including $V^{5+}$, $Si^{4+}$, or $Cr^{6+}$ was used for the cooling, the blackening resistance was poor when the concentration, in terms of atom, of the polyatomic ion was 0.001 g/L.

As shown in Tables 22, 28, 30, and 31, test pieces having plating layers containing Al and Mg within predetermined concentration ranges and containing Si had good blackening resistance independently of the temperature of the steel sheet immediately before cooling in water quenching zone 360 when an aqueous solution containing a polyatomic ion including $V^{5+}$, $Si^{4+}$, or $Cr^{6+}$ in a concentration, in terms of atom, of 0.01 g/L or more was used for the cooling. In this case, when the cooling aqueous solution contained none of $V^{5+}$, $Si^{4+}$, and $Cr^{6+}$, the blackening resistance was not improved.

As described above, the brightness degradation accelerating process was performed under the conditions No. 1 in Experiment 2. In this case, when the concentrations of Al and Mg in a plating layer fell in predetermined concentration ranges and the plating layer contained Si, the blackening resistance was good independently of the temperature of the steel sheet immediately before cooling in water quenching zone 360. On the other hand, in Experiment 3, the brightness degradation accelerating process was performed under the conditions No. 2 severer than the conditions No. 1. It was revealed, by Experiment 3, that even when a plating layer contains Si, the blackening cannot be suppressed independently of the temperature of a steel sheet immediately before cooling in water quenching zone 360 unless the cooling is performed by using a cooling aqueous solution containing a polyatomic ion including $V^{5+}$, $Si^{4+}$, or $Cr^{6+}$ in a concentration, in terms of atom, of 0.01 g/L or more. In other words, according to the method for producing a hot-dip Zn alloy-plated steel sheet of the present invention, the blackening can be suppressed independently of the presence of Si in a plating layer and independently of the temperature of a steel sheet immediately before cooling in water quenching zone 360 when the concentrations of Al and Mg in the plating layer fall in predetermined concentration ranges, and a cooling aqueous solution containing a polyatomic ion including $V^{5+}$, $Si^{4+}$, or $Cr^{6+}$ in a concentration, in terms of atom, of 0.01 g/L or more is used for the cooling.

Experiment 4

In Experiment 4, seven different hot-dip Zn alloy-plated steel sheets with plating layers having different compositions were produced by plating a base steel sheet using plating bath compositions (Nos. 1 to 7) and plating conditions shown in Table 1. In the production of each of the hot-dip Zn alloy-plated steel sheets, any one of the cooling aqueous solutions containing a polyatomic ion including $V^{5+}$, $Si^{4+}$, or $Cr^{6+}$ shown in Table 4 was used for the cooling in water quenching zone 360. Furthermore, each test piece was subjected to a chemical conversion treatment performed under chemical conversion conditions A, B, or C described below. Subsequently, blackening resistance attained when the brightness degradation accelerating process was performed under the conditions No. 2 of Table 2 in the same manner as in Experiment 3 was examined, so as to evaluate a blackening degree.

In the chemical conversion conditions A, Zinchrom 3387N (with a chromium concentration of 10 g/L, Nihon Parkerizing Co., Ltd.) was used as a chemical conversion treatment liquid. The chemical conversion treatment liquid was applied by a spray ringer-roll method to attain a coating amount of chromium of 10 mg/m².

In the chemical conversion conditions B, an aqueous solution of 50 g/L of magnesium phosphate, 10 g/L of potassium titanium fluoride, and 3 g/L of an organic acid was used as a chemical conversion treatment liquid. The chemical conversion treatment liquid was applied by a roll coating method to attain a coating amount of metal components of 50 mg/m².

In the chemical conversion conditions C, an aqueous solution of 20 g/L of a urethane resin, 3 g/L of ammonium dihydrogen phosphate, and 1 g/L of vanadium pentoxide was used as a chemical conversion treatment liquid. The chemical conversion treatment liquid was applied by the roll coating method to attain a dried film thickness of 2 μm.

With respect to each of the plated steel sheets, the relationships among the kind of cooling aqueous solution used, the temperature of the steel sheet (the surface of the plating layer) immediately before cooling in water quenching zone 360 and the evaluation result for blackening degree are shown in Table 33. It is noted that "Test Piece No." shown in Table 33 is defined in accordance with the following rule so that the experiment contents can be easily understood: Each test piece No. is determined as "(the plating No.; see Table 1)—(the cooling aqueous solution No. and the sign for the concentration of a polyatomic ion; see Tables 4 and 5)."

TABLE 33

| Test No. | Test piece No. | Chemical conversion conditions | Surface temperature of plated steel sheet immediately before cooling in water quenching zone (° C.) | | | | | Remark |
|---|---|---|---|---|---|---|---|---|
| | | | 100 | 120 | 160 | 200 | 250 | |
| 1 | 2-3b | A | A | A | A | A | A | Example |
| | | B | A | A | A | A | A | Example |
| | | C | A | A | A | A | A | Example |
| 2 | 1-12a | A | C | C | C | C | C | Comparative Example |
| | | B | C | C | C | C | C | Comparative Example |
| | | C | C | C | C | C | C | Comparative Example |
| 3 | 6-17b | A | A | A | A | A | A | Example |
| | | B | A | A | A | A | A | Example |
| | | C | A | A | A | A | A | Example |
| 4 | 4-16e | A | A | A | A | A | A | Example |
| | | B | A | A | A | A | A | Example |
| | | C | A | A | A | A | A | Example |
| 5 | 4-11b | A | A | A | A | A | A | Example |
| | | B | A | A | A | A | A | Example |
| | | C | A | A | A | A | A | Example |
| 6 | 7-18a | A | A | A | B | C | C | Comparative Example |
| | | B | A | A | B | C | C | Comparative Example |
| | | C | A | A | B | C | C | Comparative Example |

TABLE 33-continued

| Test No. | Test piece No. | Chemical conversion conditions | Surface temperature of plated steel sheet immediately before cooling in water quenching zone (° C.) | | | | | Remark |
|---|---|---|---|---|---|---|---|---|
| | | | 100 | 120 | 160 | 200 | 250 | |
| 7 | 3-3b | A | A | A | A | A | A | Example |
| | | B | A | A | A | A | A | Example |
| | | C | A | A | A | A | A | Example |
| 8 | 1-24b | A | C | C | C | C | C | Comparative Example |
| | | B | C | C | C | C | C | Comparative Example |
| | | C | C | C | C | C | C | Comparative Example |
| 9 | 5-31b | A | A | B | C | C | C | Comparative Example |
| | | B | A | B | C | C | C | Comparative Example |
| | | C | A | B | C | C | C | Comparative Example |

As shown as Test Nos. 1 to 5 in Table 33, even when a test piece having a plating layer containing Al and Mg and not containing Si was subjected to the chemical conversion treatment under any of the conditions, the blackening resistance was good when an aqueous solution containing a polyatomic ion in a concentration, in terms of atom, of 0.01 g/L or more was used for the cooling.

Furthermore, as shown as Test Nos. 6 and 7, even when a test piece having a plating layer containing Al and Mg and also containing Si was subjected to the chemical conversion treatment under any of the conditions, the blackening resistance was good when an aqueous solution containing a polyatomic ion in a concentration, in terms of atom, of 0.01 g/L or more was used for the cooling.

By contrast, as shown as Test No. 8, even when a test piece having a plating layer containing Al and Mg and not containing Si was subjected to the chemical conversion treatment under any of the conditions, the blackening could not be suppressed when a cooling aqueous solution containing none of $V^{5+}$, $Si^{4+}$, and $Cr^{6+}$ was used.

As shown as Test No. 9, even when a test piece having a plating layer containing Al and Mg within predetermined concentration ranges and also containing Si was subjected to the chemical conversion treatment under any of the conditions, the blackening could not be suppressed when a cooling aqueous solution containing none of $V^{5+}$, $Si^{4+}$, and $Cr^{6+}$ was used.

As described so far, a hot-dip Zn alloy-plated steel sheet obtained by the production method of the present invention shows good blackening resistance independently of the type of chemical conversion treatment.

Experiment 5

In Experiment 5, two different hot-dip Zn alloy-plated steel sheets with plating layers having different compositions were produced by forming a plating layer on a hot-rolled steel sheet with a thickness of 2.3 mm used as a base steel sheet (steel strip S) using plating bath compositions (No. 9 or 10) and plating conditions shown in Table 34. In the production of the hot-dip Zn alloy-plated steel sheets, the same cooling method as that employed in Experiment 1 (see paragraph 0068) or Experiment 2 (see paragraph 0079) was employed. Subsequently, the blackening resistance attained when the brightness degradation accelerating process was performed under the conditions No. 1 and No. 2 of Table 2 was examined in the same manner as in Experiment 1, so as to evaluate a blackening degree. An [Al/Zn/Zn$_2$Mg ternary eutectic structure] was found, through observation of a cross section of the plating layer, in both the hot-dip Zn alloy-plated steel sheets.

TABLE 34

| Plating No. | Plating bath composition (with balance of Zn) (% by mass) | | | | | Plating conditions | | |
|---|---|---|---|---|---|---|---|---|
| | Al | Mg | Si | Ti | B | Bath temperature (° C.) | Coating amount (g/m$^2$) | Passing speed (m/min) |
| 9 | 6.0 | 3.0 | — | 0.008 | — | 430 | 90 | 80 |
| 10 | 11.0 | 3.0 | 0.200 | 0.080 | — | 450 | 90 | 80 |

First, the evaluation results for blackening degrees of the hot-dip Zn alloy-plated steel sheets produced using the same cooling conditions as in Experiment 1 are shown in Table 35.

TABLE 35

| Test piece No. | Plating No. | Brightness degradation accelerating conditions No. | Surface temperature of plated steel sheet immediately before cooling in water quenching zone (° C.) | | | | | Remark |
|---|---|---|---|---|---|---|---|---|
| | | | 100 | 120 | 160 | 200 | 250 | |
| A-9 | 9 | 1 | A | B | C | C | C | Comparative Example |
| A-10 | 10 | 1 | A | A | A | A | A | Comparative Example |
| B-9 | 9 | 2 | C | C | C | C | C | Comparative Example |
| B-10 | 10 | 2 | A | A | B | C | C | Comparative Example |

As shown in Table 35, a test piece having a plating layer not containing Si (Test piece No. A-9) was blackened when subjected to the brightness degradation accelerating process under the conditions No. 1 unless the surface temperature of the steel sheet immediately before cooling in water quenching zone 360 was lowered to 100° C. A test piece subjected to the brightness degradation accelerating process under the conditions No. 2 (Test piece No. B-9) was blackened even when the surface temperature of the steel sheet was lowered to 100° C.

On the other hand, a test piece having a plating layer containing Si (Test piece No. A-10) was not blackened and showed good blackening resistance even when the surface temperature of the steel sheet immediately before cooling in water quenching zone 360 was 250° C. when the brightness degradation accelerating process was performed under the conditions No. 1. A test piece subjected to the brightness degradation accelerating process under the conditions No. 2 (Test piece No. B-10), however, was blackened unless the surface temperature of the steel sheet immediately before cooling in water quenching zone 360 was lowered to 120° C.

Experiment 6

Next, the two different hot-dip Zn alloy-plates steel sheets produced in Experiment 5 were cooled under the same conditions as in Experiment 2 and subjected to the brightness degradation accelerating process under the conditions No. 1, and the blackening resistance attained in this case was examined and evaluated in the same manner as in Experiment 1.

A correspondence between the plating No. of an evaluated hot-dip Zn alloy-plated steel sheet and the concentration of an additive in a used cooling aqueous solution is shown in Table 36. The results are shown in tables listed in Table 36.

TABLE 36

| Plating No. | Concentration of polyatomic ion (in terms of atom; g/L) | | | | |
|---|---|---|---|---|---|
| | 0.001 | 0.01 | 0.1 | 1.0 | 10 |
| 9 | Table 37 | Table 38 | — | — | — |
| 10 | — | Table 39 | — | — | — |

With respect to each of the plated steel sheets, the relationships among the kind of cooling aqueous solution used, the temperature of the steel sheet (plating layer surface) immediately before cooling in water quenching zone 360 and the evaluation result for blackening degree are shown in Tables 37 to 39.

TABLE 37

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 1-9-1a | 1 | A | B | C | C | C | Comparative Example |
| 1-9-2a | 2 | A | B | C | C | C | Comparative Example |
| 1-9-3a | 3 | A | B | C | C | C | Comparative Example |
| 1-9-4a | 4 | A | B | C | C | C | Comparative Example |
| 1-9-5a | 5 | A | B | C | C | C | Comparative Example |
| 1-9-6a | 6 | A | B | C | C | C | Comparative Example |
| 1-9-7a | 7 | A | B | C | C | C | Comparative Example |
| 1-9-8a | 8 | A | B | C | C | C | Comparative Example |
| 1-9-9a | 9 | A | B | C | C | C | Comparative Example |
| 1-9-10a | 10 | A | B | C | C | C | Comparative Example |
| 1-9-11a | 11 | A | B | C | C | C | Comparative Example |
| 1-9-12a | 12 | A | B | C | C | C | Comparative Example |
| 1-9-13a | 13 | A | B | C | C | C | Comparative Example |
| 1-9-14a | 14 | A | B | C | C | C | Comparative Example |
| 1-9-15a | 15 | A | B | C | C | C | Comparative Example |
| 1-9-16a | 16 | A | B | C | C | C | Comparative Example |
| 1-9-17a | 17 | A | B | C | C | C | Comparative Example |
| 1-9-18a | 18 | A | B | C | C | C | Comparative Example |
| 1-9-19a | 19 | A | B | C | C | C | Comparative Example |
| 1-9-20a | 20 | A | B | C | C | C | Comparative Example |
| 1-9-21a | 21 | A | B | C | C | C | Comparative Example |
| 1-9-22a | 22 | A | B | C | C | C | Comparative Example |
| 1-9-23a | 23 | A | B | C | C | C | Comparative Example |
| 1-9-24a | 24 | A | B | C | C | C | Comparative Example |
| 1-9-25a | 25 | A | B | C | C | C | Comparative Example |
| 1-9-26a | 26 | A | B | C | C | C | Comparative Example |
| 1-9-27a | 27 | A | B | C | C | C | Comparative Example |
| 1-9-28a | 28 | A | B | C | C | C | Comparative Example |
| 1-9-29a | 29 | A | B | C | C | C | Comparative Example |
| 1-9-30a | 30 | A | B | C | C | C | Comparative Example |
| 1-9-31a | 31 | A | B | C | C | C | Comparative Example |

TABLE 38

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 1-9-1b | 1 | A | A | B | C | C | Comparative Example |
| 1-9-2b | 2 | A | B | C | C | C | Comparative Example |
| 1-9-3b | 3 | A | A | A | A | A | Example |
| 1-9-4b | 4 | A | A | B | C | C | Comparative Example |
| 1-9-5b | 5 | A | A | B | C | C | Comparative Example |
| 1-9-6b | 6 | A | A | B | C | C | Comparative Example |
| 1-9-7b | 7 | A | A | B | C | C | Comparative Example |
| 1-9-8b | 8 | A | B | C | C | C | Comparative Example |
| 1-9-9b | 9 | A | B | C | C | C | Comparative Example |
| 1-9-10b | 10 | A | B | C | C | C | Comparative Example |
| 1-9-11b | 11 | A | A | A | A | A | Example |
| 1-9-12b | 12 | A | A | A | A | A | Example |
| 1-9-13b | 13 | A | A | A | A | A | Example |
| 1-9-14b | 14 | A | A | A | A | A | Example |
| 1-9-15b | 15 | A | A | A | A | A | Example |
| 1-9-16b | 16 | A | A | A | A | A | Example |
| 1-9-17b | 17 | A | A | A | A | A | Example |
| 1-9-18b | 18 | A | A | A | A | A | Example |
| 1-9-19b | 19 | A | B | C | C | C | Comparative Example |
| 1-9-20b | 20 | A | B | C | C | C | Comparative Example |
| 1-9-21b | 21 | A | A | B | C | C | Comparative Example |
| 1-9-22b | 22 | A | B | C | C | C | Comparative Example |
| 1-9-23b | 23 | A | B | C | C | C | Comparative Example |
| 1-9-24b | 24 | A | B | C | C | C | Comparative Example |
| 1-9-25b | 25 | A | B | C | C | C | Comparative Example |
| 1-9-26b | 26 | A | B | C | C | C | Comparative Example |
| 1-9-27b | 27 | A | A | B | C | C | Comparative Example |
| 1-9-28b | 28 | A | A | B | C | C | Comparative Example |
| 1-9-29b | 29 | A | A | B | C | C | Comparative Example |
| 1-9-30b | 30 | A | B | C | C | C | Comparative Example |
| 1-9-31b | 31 | A | B | C | C | C | Comparative Example |

TABLE 39

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 1-10-1b | 1 | A | A | A | A | A | Comparative Example |
| 1-10-2b | 2 | A | A | A | A | A | Comparative Example |
| 1-10-3b | 3 | A | A | A | A | A | Example |
| 1-10-4b | 4 | A | A | A | A | A | Comparative Example |
| 1-10-5b | 5 | A | A | A | A | A | Comparative Example |
| 1-10-6b | 6 | A | A | A | A | A | Comparative Example |
| 1-10-7b | 7 | A | A | A | A | A | Comparative Example |
| 1-10-8b | 8 | A | A | A | A | A | Comparative Example |
| 1-10-9b | 9 | A | A | A | A | A | Comparative Example |
| 1-10-10b | 10 | A | A | A | A | A | Comparative Example |
| 1-10-11b | 11 | A | A | A | A | A | Example |
| 1-10-12b | 12 | A | A | A | A | A | Example |
| 1-10-13b | 13 | A | A | A | A | A | Example |
| 1-10-14b | 14 | A | A | A | A | A | Example |
| 1-10-15b | 15 | A | A | A | A | A | Example |
| 1-10-16b | 16 | A | A | A | A | A | Example |
| 1-10-17b | 17 | A | A | A | A | A | Example |
| 1-10-18b | 18 | A | A | A | A | A | Example |
| 1-10-19b | 19 | A | A | A | A | A | Comparative Example |
| 1-10-20b | 20 | A | A | A | A | A | Comparative Example |
| 1-10-21b | 21 | A | A | A | A | A | Comparative Example |
| 1-10-22b | 22 | A | A | A | A | A | Comparative Example |
| 1-10-23b | 23 | A | A | A | A | A | Comparative Example |
| 1-10-24b | 24 | A | A | A | A | A | Comparative Example |
| 1-10-25b | 25 | A | A | A | A | A | Comparative Example |
| 1-10-26b | 26 | A | A | A | A | A | Comparative Example |
| 1-10-27b | 27 | A | A | A | A | A | Comparative Example |
| 1-10-28b | 28 | A | A | A | A | A | Comparative Example |
| 1-10-29b | 29 | A | A | A | A | A | Comparative Example |

TABLE 39-continued

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 1-10-30b | 30 | A | A | A | A | A | Comparative Example |
| 1-10-31b | 31 | A | A | A | A | A | Comparative Example |

As shown in Table 37, in a test piece cooled by using a cooling aqueous solution containing a polyatomic ion including $V^{5+}$, $Si^{4+}$, or $Cr^{6+}$ in a concentration, in terms of atom, of 0.001 g/L, the blackening could not be suppressed.

As shown in Table 38, when a cooling aqueous solution containing a polyatomic ion including $V^{5+}$, $Si^{4+}$, or $Cr^{6+}$ in a concentration, in terms of atom, of 0.01 g/L was used for the cooling, good blackening resistance was attained independently of the surface temperature of the plated steel sheet immediately before cooling in water quenching zone 360.

On the other hand, as shown in Table 39, when a test piece having a plating layer containing Al and Mg within predetermined concentration ranges and also containing Si was cooled by using a cooling aqueous solution containing a polyatomic ion including $V^{5+}$, $Si^{4+}$, or $Cr^{6+}$ in a concentration, in terms of atom, of 0.01 g/L, good blackening resistance was attained independently of the surface temperature of the plated steel sheet immediately before cooling in water quenching zone 360.

Experiment 7

Next, the two different hot-dip Zn alloy-plated steel sheets were produced in the same manner as in Experiment 6, and the blackening resistance attained when the brightness degradation accelerating process was performed under the conditions No. 2 in the same manner as in Experiment 3 was examined and evaluated in the same manner as in Experiment 1.

A correspondence between the plating No. of an evaluated hot-dip Zn alloy-plated steel sheet and the concentration of an additive in a used cooling aqueous solution is shown in Table 40. The results are shown in tables listed in Table 40.

TABLE 40

| | Concentration of polyatomic ion (in terms of atom; g/L) | | | | |
|---|---|---|---|---|---|
| Plating No. | 0.001 | 0.01 | 0.1 | 1.0 | 10 |
| 9 | Table 41 | Table 42 | — | — | — |
| 10 | Table 43 | Table 44 | — | — | — |

TABLE 41

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-9-1a | 1 | C | C | C | C | C | Comparative Example |
| 2-9-2a | 2 | C | C | C | C | C | Comparative Example |
| 2-9-3a | 3 | C | C | C | C | C | Comparative Example |
| 2-9-4a | 4 | C | C | C | C | C | Comparative Example |
| 2-9-5a | 5 | C | C | C | C | C | Comparative Example |
| 2-9-6a | 6 | C | C | C | C | C | Comparative Example |
| 2-9-7a | 7 | C | C | C | C | C | Comparative Example |
| 2-9-8a | 8 | C | C | C | C | C | Comparative Example |
| 2-9-9a | 9 | C | C | C | C | C | Comparative Example |
| 2-9-10a | 10 | C | C | C | C | C | Comparative Example |
| 2-9-11a | 11 | C | C | C | C | C | Comparative Example |
| 2-9-12a | 12 | C | C | C | C | C | Comparative Example |
| 2-9-13a | 13 | C | C | C | C | C | Comparative Example |
| 2-9-14a | 14 | C | C | C | C | C | Comparative Example |
| 2-9-15a | 15 | C | C | C | C | C | Comparative Example |
| 2-9-16a | 16 | C | C | C | C | C | Comparative Example |
| 2-9-17a | 17 | C | C | C | C | C | Comparative Example |
| 2-9-18a | 18 | C | C | C | C | C | Comparative Example |
| 2-9-19a | 19 | C | C | C | C | C | Comparative Example |
| 2-9-20a | 20 | C | C | C | C | C | Comparative Example |
| 2-9-21a | 21 | C | C | C | C | C | Comparative Example |
| 2-9-22a | 22 | C | C | C | C | C | Comparative Example |
| 2-9-23a | 23 | C | C | C | C | C | Comparative Example |
| 2-9-24a | 24 | C | C | C | C | C | Comparative Example |
| 2-9-25a | 25 | C | C | C | C | C | Comparative Example |
| 2-9-26a | 26 | C | C | C | C | C | Comparative Example |
| 2-9-27a | 27 | C | C | C | C | C | Comparative Example |
| 2-9-28a | 28 | C | C | C | C | C | Comparative Example |
| 2-9-29a | 29 | C | C | C | C | C | Comparative Example |
| 2-9-30a | 30 | C | C | C | C | C | Comparative Example |
| 2-9-31a | 31 | C | C | C | C | C | Comparative Example |

TABLE 42

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-9-1b | 1 | C | C | C | C | C | Comparative Example |
| 2-9-2b | 2 | C | C | C | C | C | Comparative Example |
| 2-9-3b | 3 | A | A | A | A | A | Example |
| 2-9-4b | 4 | C | C | C | C | C | Comparative Example |
| 2-9-5b | 5 | C | C | C | C | C | Comparative Example |
| 2-9-6b | 6 | C | C | C | C | C | Comparative Example |
| 2-9-7b | 7 | C | C | C | C | C | Comparative Example |
| 2-9-8b | 8 | C | C | C | C | C | Comparative Example |
| 2-9-9b | 9 | C | C | C | C | C | Comparative Example |
| 2-9-10b | 10 | C | C | C | C | C | Comparative Example |
| 2-9-11b | 11 | A | A | A | A | A | Example |
| 2-9-12b | 12 | A | A | A | A | A | Example |
| 2-9-13b | 13 | A | A | A | A | A | Example |
| 2-9-14b | 14 | A | A | A | A | A | Example |
| 2-9-15b | 15 | A | A | A | A | A | Example |
| 2-9-16b | 16 | A | A | A | A | A | Example |
| 2-9-17b | 17 | A | A | A | A | A | Example |
| 2-9-18b | 18 | A | A | A | A | A | Example |
| 2-9-19b | 19 | C | C | C | C | C | Comparative Example |
| 2-9-20b | 20 | C | C | C | C | C | Comparative Example |
| 2-9-21b | 21 | C | C | C | C | C | Comparative Example |
| 2-9-22b | 22 | C | C | C | C | C | Comparative Example |
| 2-9-23b | 23 | C | C | C | C | C | Comparative Example |
| 2-9-24b | 24 | C | C | C | C | C | Comparative Example |
| 2-9-25b | 25 | C | C | C | C | C | Comparative Example |
| 2-9-26b | 26 | C | C | C | C | C | Comparative Example |
| 2-9-27b | 27 | C | C | C | C | C | Comparative Example |
| 2-9-28b | 28 | C | C | C | C | C | Comparative Example |
| 2-9-29b | 29 | C | C | C | C | C | Comparative Example |
| 2-9-30b | 30 | C | C | C | C | C | Comparative Example |
| 2-9-31b | 31 | C | C | C | C | C | Comparative Example |

TABLE 43

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-10-1a | 1 | A | A | B | C | C | Comparative Example |
| 2-10-2a | 2 | A | A | B | C | C | Comparative Example |
| 2-10-3a | 3 | A | A | B | C | C | Comparative Example |
| 2-10-4a | 4 | A | A | B | C | C | Comparative Example |
| 2-10-5a | 5 | A | A | B | C | C | Comparative Example |
| 2-10-6a | 6 | A | A | B | C | C | Comparative Example |
| 2-10-7a | 7 | A | A | B | C | C | Comparative Example |
| 2-10-8a | 8 | A | A | B | C | C | Comparative Example |
| 2-10-9a | 9 | A | A | B | C | C | Comparative Example |
| 2-10-10a | 10 | A | A | B | C | C | Comparative Example |
| 2-10-11a | 11 | A | A | B | C | C | Comparative Example |
| 2-10-12a | 12 | A | A | B | C | C | Comparative Example |
| 2-10-13a | 13 | A | A | B | C | C | Comparative Example |
| 2-10-14a | 14 | A | A | B | C | C | Comparative Example |
| 2-10-15a | 15 | A | A | B | C | C | Comparative Example |
| 2-10-16a | 16 | A | A | B | C | C | Comparative Example |
| 2-10-17a | 17 | A | A | B | C | C | Comparative Example |
| 2-10-18a | 18 | A | A | B | C | C | Comparative Example |
| 2-10-19a | 19 | A | A | B | C | C | Comparative Example |
| 2-10-20a | 20 | A | A | B | C | C | Comparative Example |
| 2-10-21a | 21 | A | A | B | C | C | Comparative Example |
| 2-10-22a | 22 | A | A | B | C | C | Comparative Example |
| 2-10-23a | 23 | A | A | B | C | C | Comparative Example |
| 2-10-24a | 24 | A | A | B | C | C | Comparative Example |
| 2-10-25a | 25 | A | A | B | C | C | Comparative Example |
| 2-10-26a | 26 | A | A | B | C | C | Comparative Example |
| 2-10-27a | 27 | A | A | B | C | C | Comparative Example |
| 2-10-28a | 28 | A | A | B | C | C | Comparative Example |
| 2-10-29a | 29 | A | A | B | C | C | Comparative Example |

TABLE 43-continued

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-10-30a | 30 | A | A | B | C | C | Comparative Example |
| 2-10-31a | 31 | A | A | B | C | C | Comparative Example |

TABLE 44

| Test piece No. | Cooling aqueous solution No. | Surface temperature of plated steel sheet immediately before cooling in water quenching zone (° C.) | | | | | Remark |
|---|---|---|---|---|---|---|---|
| | | 100 | 120 | 160 | 200 | 250 | |
| 2-10-1b | 1 | A | A | A | B | C | Comparative Example |
| 2-10-2b | 2 | A | A | B | C | C | Comparative Example |
| 2-10-3b | 3 | A | A | A | A | A | Example |
| 2-10-4b | 4 | A | A | A | B | C | Comparative Example |
| 2-10-5b | 5 | A | A | A | B | C | Comparative Example |
| 2-10-6b | 6 | A | A | A | B | C | Comparative Example |
| 2-10-7b | 7 | A | A | A | B | C | Comparative Example |
| 2-10-8b | 8 | A | A | B | C | C | Comparative Example |
| 2-10-9b | 9 | A | A | B | C | C | Comparative Example |
| 2-10-10b | 10 | A | A | B | C | C | Comparative Example |
| 2-10-11b | 11 | A | A | A | A | A | Example |
| 2-10-12b | 12 | A | A | A | A | A | Example |
| 2-10-13b | 13 | A | A | A | A | A | Example |
| 2-10-14b | 14 | A | A | A | A | A | Example |
| 2-10-15b | 15 | A | A | A | A | A | Example |
| 2-10-16b | 16 | A | A | A | A | A | Example |
| 2-10-17b | 17 | A | A | A | A | A | Example |
| 2-10-18b | 18 | A | A | A | A | A | Example |
| 2-10-19b | 19 | A | A | B | C | C | Comparative Example |
| 2-10-20b | 20 | A | A | B | C | C | Comparative Example |
| 2-10-21b | 21 | A | A | B | B | C | Comparative Example |
| 2-10-22b | 22 | A | A | B | C | C | Comparative Example |
| 2-10-23b | 23 | A | A | B | C | C | Comparative Example |
| 2-10-24b | 24 | A | A | B | C | C | Comparative Example |
| 2-10-25b | 25 | A | A | B | C | C | Comparative Example |
| 2-10-26b | 26 | A | A | B | C | C | Comparative Example |
| 2-10-27b | 27 | A | A | A | B | C | Comparative Example |
| 2-10-28b | 28 | A | A | A | B | C | Comparative Example |
| 2-10-29b | 29 | A | A | A | B | C | Comparative Example |
| 2-10-30b | 30 | A | A | B | C | C | Comparative Example |
| 2-10-31b | 31 | A | A | B | C | C | Comparative Example |

As shown in Tables 41 and 43, even when a plating layer contained Al and Mg within predetermined concentration ranges and the cooling was performed by using a cooling aqueous solution containing a polyatomic ion including $V^{5+}$, $Si^{4+}$, or $Cr^{6+}$, the blackening resistance could not be improved when the concentration of the polyatomic ion, in terms of atom, was 0.001 g/L.

As shown in Table 42, in a test piece having a plating layer containing Al and Mg within predetermined concentration ranges and also containing Ti, the blackening resistance was good independently of the surface temperature of the plated steel sheet immediately before cooling in water quenching zone 360 as long as a cooling aqueous solution containing a polyatomic ion including $V^{5+}$, $Si^{4+}$, or $Cr^{6+}$ in a concentration, in terms of atom, of 0.01 g/L was used for the cooling.

As shown in Table 44, in a test piece having a plating layer containing Al and Mg within predetermined concentration ranges and also containing Si and Ti, the blackening resistance was good independently of the surface temperature of the plated steel sheet immediately before cooling in water quenching zone 360 as long as a cooling aqueous solution containing a polyatomic ion including $V^{5+}$, $Si^{4+}$, or $Cr^{6+}$ in a concentration, in terms of atom, of 0.01 g/L was used for the cooling. In Tables 42 and 44, the blackening resistance was not improved in test pieces cooled by using a cooling aqueous solution containing none of $V^{5+}$, $Si^{4+}$, and $Cr^{6+}$.

INDUSTRIAL APPLICABILITY

A hot-dip Zn alloy-plated steel sheet obtained by the production method of the present invention is excellent in blackening resistance, and hence is useful as a plated steel sheet for roofing materials or façade cladding materials, home electrical appliances, automobiles, for example.

The present application is based upon and claims the benefit of priority of the prior Japanese Patent Application No. 2012-258582, filed on Nov. 27, 2012, and Japanese Patent Application No. 2013-019275, filed on Feb. 4, 2013, the entire contents of which are incorporated herein by reference.

REFERENCE SIGNS LIST 100, 200 cooling apparatus
110 spray nozzle
120, 230 squeeze roller
130 housing
210 immersion tank
220 immersion roll
300 production line
310 furnace
320 plating bath
330 wiping nozzle
340 air jet cooler
350 mist cooling zone
360 water quenching zone
370 skin pass mill
380 tension leveler
390 tension reel
400 roll coater
410 drying zone
420 air cooling zone
S steel strip

The invention claimed is:

1. A method for producing a hot-dip Zn alloy-plated steel sheet, comprising:
   forming a hot-dip Zn alloy plating layer on a surface of a substrate steel sheet by immersing the substrate steel sheet in a hot-dip Zn alloy plating bath containing Al and Mg; and
   contacting a surface of the hot-dip Zn alloy plating layer with an aqueous solution obtained by dissolving, in water, at least one compound selected from the group consisting of vanadium acetylacetonate, vanadium oxysulfate, and vanadium pentoxide, to cool the substrate steel sheet and the hot-dip Zn alloy plating layer whose temperatures have been increased through formation of the hot-dip Zn alloy plating layer,
   wherein the aqueous solution contains a polyatomic ion in a concentration of 0.01 g/L or more in terms of atom of V,
   wherein a surface temperature of the hot-dip Zn alloy plating layer is 100° C. or above and equal to or less than a solidifying point of the plating layer when the surface of the hot-dip Zn alloy plating layer is contacted with the aqueous solution.

2. The method for producing a hot-dip Zn alloy-plated steel sheet according to claim 1, wherein the hot-dip Zn alloy plating layer contains 1.0 to 22.0% by mass of Al, 0.1 to 10.0% by mass of Mg with the balance of Zn and unavoidable impurities.

3. The method for producing a hot-dip Zn alloy-plated steel sheet according to claim 2, wherein the hot-dip Zn alloy plating layer further contains 0.001 to 2.0% by mass of Si.

4. The method for producing a hot-dip Zn alloy-plated steel sheet according to claim 3, wherein the hot-dip Zn alloy plating layer further contains 0.001 to 0.1% by mass of Ti.

5. The method for producing a hot-dip Zn alloy-plated steel sheet according to claim 4, wherein the hot-dip Zn alloy plating layer further contains 0.001 to 0.045% by mass of B.

6. The method for producing a hot-dip Zn alloy-plated steel sheet according to claim 2, wherein the hot-dip Zn alloy plating layer further contains 0.001 to 0.1% by mass of Ti.

7. The method for producing a hot-dip Zn alloy-plated steel sheet according to claim 6, wherein the hot-dip Zn alloy plating layer further contains 0.001 to 0.045% by mass of B.

8. The method for producing a hot-dip Zn alloy-plated steel sheet according to claim 1, further comprising,
   removing aqueous solution coated on the surface of the hot-dip Zn alloy plating layer,
   wherein a chemical treatment coating film formed from the aqueous solution does not remain on the surface of the hot-dip Zn alloy plating layer after removal of the aqueous solution.

9. The method for producing a hot-dip Zn alloy-plated steel sheet according to claim 1, wherein the aqueous solution further contains a dissolution promoter selected from the group consisting of 2-aminoethanol, tetraethyl ammonium hydroxide, ethylene diamine, 2,2'-iminodiethanol, and 1-amino-2-propanol.

* * * * *